United States Patent
Ma et al.

(10) Patent No.: US 12,518,513 B2
(45) Date of Patent: Jan. 6, 2026

(54) SYSTEMS AND METHODS FOR PROCESSING MULTI-MODAL IMAGES

(71) Applicant: Mitsubishi Electric Research Laboratories, Inc., Cambridge, MA (US)

(72) Inventors: Yanting Ma, Cambridge, MA (US); Petros Boufounos, Winchester, MA (US); Philip Orlik, Cambridge, MA (US); Joshua Rapp, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 702 days.

(21) Appl. No.: 18/052,238

(22) Filed: Nov. 3, 2022

(65) Prior Publication Data

US 2025/0363779 A1    Nov. 27, 2025

(51) Int. Cl.
    *G06V 10/774* (2022.01)
    *G06T 3/147* (2024.01)
    *G06V 10/40* (2022.01)
    *G06V 10/82* (2022.01)

(52) U.S. Cl.
    CPC ........... *G06V 10/774* (2022.01); *G06T 3/147* (2024.01); *G06V 10/40* (2022.01); *G06V 10/82* (2022.01)

(58) Field of Classification Search
    None
    See application file for complete search history.

(56) References Cited

U.S. PATENT DOCUMENTS

| | | | |
|---|---|---|---|
| 2020/0184660 A1* | 6/2020 | Shi | G06T 7/30 |
| 2021/0042878 A1* | 2/2021 | Ghose | G06T 7/33 |
| 2022/0020114 A1* | 1/2022 | George | G01S 13/89 |
| 2022/0414903 A1* | 12/2022 | Tian | G06V 10/758 |

OTHER PUBLICATIONS

Toriya, H., Dewan, A. and Kitahara, I., Jul. 2019. SAR2OPT: Image alignment between multi-modal images using generative adversarial networks. In IGARSS 2019-2019 IEEE International Geoscience and Remote Sensing Symposium (pp. 923-926). IEEE.

Kolkin, N., Salavon, J. and Shakhnarovich, G., 2019. Style transfer by relaxed optimal transport and self-similarity. In Proceedings of the IEEE/CVF Conference on Computer Vision and Pattern Recognition (pp. 10051-10060).

(Continued)

*Primary Examiner* — Leon Flores
(74) *Attorney, Agent, or Firm* — Gene Vinokur

(57) ABSTRACT

A method for training a neural network for extracting domain-invariant features suitable for image registration comprises collecting a first set of multi-modal images including at least a first image of a first modality and at least one corresponding second image of a second modality. Using feature extraction subnets of the neural network, first features are extracted from the at least one first image while second features are extracted from the at least one second image. A domain invariant loss and homography loss is estimated for the images and the neural network is trained to minimize a multi-objective loss function including the domain-invariant embedding loss and the homography loss.

20 Claims, 16 Drawing Sheets

(56) References Cited

OTHER PUBLICATIONS

DeTone, D., Malisiewicz, T. and Rabinovich, A., 2016. Deep image homography estimation. arXiv preprint arXiv:1606.03798.
Wang et al. "A Segmentation Based Robust Deep Learning Framework for Multimodal Retinal Image Registration," XP033793718.
Aline et al. "Multi Modal Retinal Image Registration using a Keypoint Based Vessel Structure Aligning Network," ZP047633831.
Jinrong et al. "Towards Accurate and Robust Multi Modal Medical Image Registration using Contrastive Metric Learning," XP011747350.

* cited by examiner

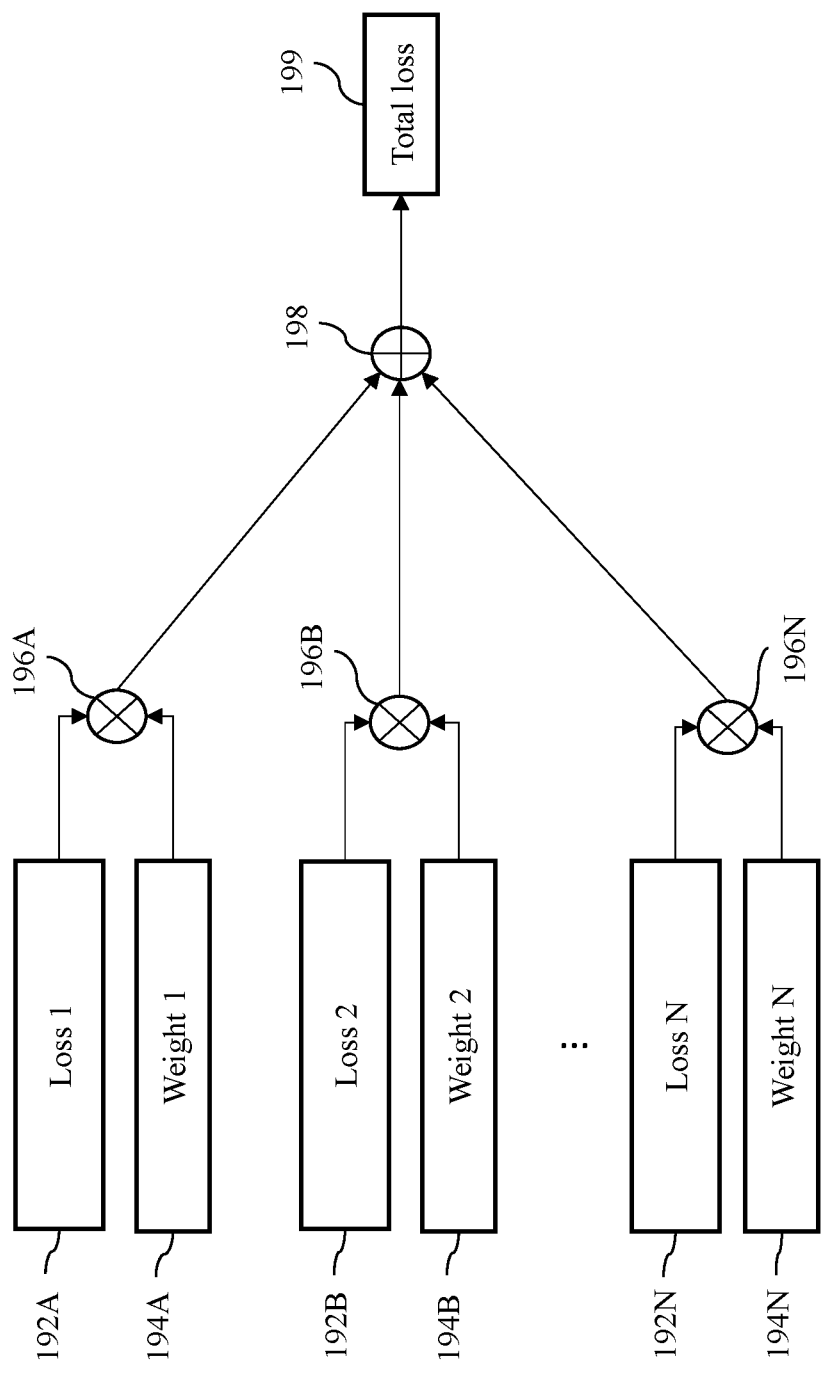

SYSTEMS AND METHODS FOR PROCESSING MULTI-MODAL IMAGES

TECHNICAL FIELD

The present disclosure relates generally to image processing systems and methods, and more particularly to systems and methods for training a neural network for registration of multi-modal images. The present disclosure also relates to systems and methods for registration of such multi-modal images.

BACKGROUND

Image registration geometrically aligns two images with different viewing geometry and/or different deformations into the same coordinate system so that the corresponding pixels represent the same objects and/or features. Accurate image-to-image registration improves usability in many applications including georeferencing, change detection and time series analysis, data fusion, the formation of image mosaics, digital elevation model (DEM) extraction, 3D modeling, video compression and motion analysis, etc. Several imaging techniques are available for imaging a scene. Since each imaging technique has its own strengths and weaknesses and may provide different types of information, it may be advantageous in practice to combine different imaging techniques to accurately depict features of a scene. In order to successfully integrate two or more imaging systems and/or combine information provided by distinct systems, it is necessary to register image data that may often be obtained in different modalities.

Conventional image registration methods are applicable for images from a common regime and type. For example, in instances where the images do not belong to a common regime (for example when they are of different modalities), registration using the conventional methods maybe impractical and/or computationally challenging.

Conventional image registration methods usually align two images (for example a first image and a second image) by first defining a feature extraction method to extract a feature vector for each pixel in the images, and then for each pixel in the first image, its corresponding pixel in the second image is defined as the pixel whose feature vector is closest (measured by some distance such as Euclidean distance) to the feature vector of that pixel in the first image (this procedure is referred to as feature matching). This registration method can be successful if the feature vectors have the property that the distance between the feature vectors of corresponding pixels is smaller than the distance between the feature vectors of non-corresponding pixels. Feature vectors with this property are easier to define for images formed by the same imaging technique. For example, for gray-scale optical images, histogram of image gradients at each pixel is a commonly used type of feature vector (for instance, SIFT feature belongs to this type). However, when the images to be registered are formed by different imaging techniques, the pixel values in the two images represent different physical quantities and it is challenging to define feature vectors with the desired property. For example, in optical images, pixel values represent optical reflectivity, whereas in radar images, pixel values represent electric permittivity. An optical image and a radar image can have very different appearance even if they are images of a common scene, and in such a case, histogram of image gradients will not have the desired property for feature matching.

Therefore, to meet the requirements of modern imaging applications, there is a need to develop universally applicable image registration systems and methods suitable for multimodal images of three dimensional (3D) scenes. There is also a need to develop such systems and methods that avoid undue processing burden and instead utilize a simplified pipeline for processing the multi-modal images.

SUMMARY

Image registration is the process of transforming different sets of data into one coordinate system. Data may be multiple photographs, data from different sensors, times, depths, or viewpoints. It is used in computer vision, medical imaging, aerial photography, remote sensing (cartography updating), and compiling and analyzing images and data from satellites. For example, images of a three-dimensional scene taken from different view angles with different illumination spectral bands can potentially capture rich information about the scene, provided that those images can be efficiently fused. Registration of those images is a crucial step for successful fusion and/or to compare or integrate the data obtained from these different measurements.

Application of image registration methods for registering multi-modal images or precisely, when images are from different domains and of differing modalities, is a cumbersome task. Images of a scene may be of different modalities when they are obtained from differing platforms and sensors and/or using different imaging techniques. Modality of an image is mainly governed by measured spectrum of light in the image. For example, optical sensors typically operate within visible light spectrum, whereas radars typically operate within the microwave spectrum. Therefore, optical images display colors (e.g., red, green, blue) of a scene, whereas radar images display materials (e.g., water, metal, soil) of a scene. Such images are of different modalities and conventional registration approaches cannot be directly applied to them. One example of such images of modality different from optical images is a Synthetic Aperture Radar (SAR) image. Synthetic Aperture Radar (SAR) remote sensing imaging has a great advantage in all-day and all-weather conditions. SAR images generally contain rich information, such as geometric structure and material property, which is important and urgently needed in various applications, including mapping and military, etc. However, the SAR images are not very readable and are context dependent.

Some example embodiments attempt to improve readability of multi-modal images such as SAR and optical images. One line of work focuses on overlaying an optical image onto the SAR image by image registration of the two images. However, since available registration techniques do not allow direct image registration between images of differing modalities, to use these techniques, the registration methods need to transform SAR and optical images to the common space before the image registration is performed. However, such a transformation is challenging and can add noise and artifacts into the transformed images.

For example, some example embodiments are based on the realization that generating a full optical image (or an artificial optical image) from a non-optical image of different modality requires a very large dataset for training a neural network and/or a complex architecture of the neural network. There have been several neural network-based SAR-to-optical image translation methods. However, the connection between the target optical image and the generated artificial optical image is not strong enough. In addition, the brightness and spectral information of the target optical images are not comprehensively considered in such approaches. Furthermore, the generated artificial optical image may not reliably retain geometric information of the original SAR image. To that end, it is an object of some embodiments to provide an alternative method for images registration that does not require image transformation into a common domain.

Some embodiments are based on understanding that in certain applications, the underlying objective of image registration may simply be aligning of the images of different modality. Some example embodiments are also based on the realization that in such applications, the generation of an artificially optical image from a non-optical image of different modality is not required and is in fact unnecessary. Instead of generating artificially optical images using the network generated features, such an alignment can be performed based on features common for the different modalities. Such features are referred to herein as domain-invariant features. Having these domain-invariant features extracted from images of different modalities, the feature matching can be performed directly.

Some example embodiments are based on the consideration that the geometry of the images to be registered may be related by a two-dimensional (2D) homography. Hence, if the images of the same scene would be of the same modality, various neural network structures based on the principles of the homography can be used for feature registration. Such a homography-based network is referred to herein as HomographyNet. Example of the architecture of HomographyNet neural networks include a convolutional neural network (CNN) utilizing multi-layer nonlinear information processing to perform feature extraction, transformation, pattern analysis, and classification. Another example of the HomographyNet is a deep CNN (DCNN) feed forward network having two architectures: a regression network which directly estimates the real-valued homography parameters, and a classification network which produces a distribution over quantized homographies.

The homography and/or HomographyNet is not directly applicable to multi-modal images. However, some embodiments are based on realization that this deficiency of HomographyNet creating problems for multi-modal image registration can be turned into an advantage for extracting domain-invariant features. This is because this deficiency of the HomographyNet can be used as a test on invariancy of the extracted images. Indeed, if the extracted features are domain invariant, the homography becomes possible. Otherwise, the features are domain specific.

Armed with this understanding, some embodiments use HomographyNet to train a feature extraction network for extracting domain invariant features for multi-modal images. To achieve this objective, some embodiments train a feature extraction network jointly with HomographyNet to minimize the homography loss of the extracted features additionally or alternatively to minimizing the embedding loss.

In some example embodiments, a neural network comprising the feature extraction subnet for extracting domain invariant features and the HomographyNet for estimating homography between the extracted features of the input images, is utilized. In order to support keypoint matching capabilities, the neural network may be supplemented with another feature extraction subnet for extracting domain specific features. In this regard, domain invariant features may be considered as the features of the two images that can be compared directly while domain specific features are the features that cannot be compared directly.

To be more precise, according to some example embodiments, for two images from two different modalities, domain-invariant features are vectors of the same dimension such that when computing the distance between the feature vector of a pixel in the first image and the feature vector of a pixel in the second image, the distance is small if the two pixels are corresponding pixels and the distance is large if the two pixels are non-corresponding pixels. Thus these feature vectors are invariant across different image modalities and can be compared directly for the purpose of feature matching.

Domain-specific features on the other hand are not designed to be compared directly because these feature vectors may contain information that is not shared among different modalities. The properties of domain-specific features depend on the embedding loss for these features vectors used during training. For example, let $p_1$ and $p_2$ be the feature vectors of a pair of pixels in the first image and let $d_1(p_1,p_2)$ denote the pairwise feature distance in the first image. Similarly, let $q_1$ and $q_2$ be the feature vectors of a pair of pixels in the second image and let $d_2(q_1, q_2)$ denote the pairwise feature distance in the second image. Then the embedding loss can be given by $y*D(d_1(p_1, p_2), d_2(q_1, q_2))+(1-y)*\max(0, C-D(d1(p_1, p_2), d_2(q_1, q_2)))$, where $y=1$ if $p_1$ corresponds to $q_1$ and $p_2$ corresponds to $q_2$; otherwise, $y=0$. Here, $d_1$ is a distance defined on the feature space for the first image, $d_2$ is a distance defined on the feature space for the second image, D is a distance defined on real numbers, and C is a constant. With this embedding loss, $D(d_i(p_1, p_2), d_2(q_1, q_2))$ can then be used as the similarity measure for feature matching, because the neural network is trained to generate $p_1, p_2, q_1, q_2$ such that $D(d_1(p_1, p_2), d_2(q_1, q_2))$ is small if $p_1$ corresponds to $p_2$ and $q_1$ corresponds to $q_2$ and $D(d_1(p_1, p_2), d_2(q_1, q_2))$ is large otherwise.

Also, according to some example embodiments, a homography is a 3-by-3 matrix and the homography loss can be any distance defined for matrices, for example, it can be the Frobenius norm between the ground truth homography and the homography estimated by the neural network. As for the embedding loss for domain-invariant features, it can be defined as $y*d(p,q)+(1-y)*\max(0, C-d(p,q))$, where d is distance defined for vectors such as the Euclidean distance, $y=1$ if p, q are corresponding point and $y=0$ otherwise. With this embedding loss, $d(p,q)$ can then be used as similarity measure for feature matching, because the network is trained to generate features p, q such that $d(p,q)$ is small if p corresponds to q and $d(p,q)$ is large if p does not correspond to q.

Some example embodiments utilize the trained neural network to determine domain invariant features from a set of multi-modal images. According to some example embodiments, the neural network is designed to generate both domain-invariant and domain-specific features, which are suitable to be utilized in fused Gromov-Wasserstein (GW) distance for generating high-probability correspondence points.

Towards these ends, some example embodiments provide a computer implemented method for training a neural network for extracting domain-invariant features suitable for image registration. In this regard, the method comprises collecting a first set of multi-modal images including at least a first image of a first modality and at least one corresponding second image of a second modality different from the first modality. The method further comprises extracting first features from the at least one first image using a first feature extraction subnet of the neural network, and extracting second features from the at least one second image using a second feature extraction subnet of the neural network. The method further comprises comparing the first features with the second features to estimate a domain invariant embedding loss of extracted features of the first set of multi-modal images and submitting the first features and the second features to a HomographyNet of the neural network to estimate a homography loss of the extracted features of the first set of multi-modal images. The method further comprises training the first feature extraction subnet, the second feature extraction subnet of the neural network and the HomographyNet to jointly minimize a multi-objective loss function including the domain invariant embedding loss and the homography loss.

Some example embodiments also provide a system for training a neural network for extracting domain-invariant features suitable for image registration. The system comprises a processor configured to execute instructions stored in memory to cause the system to collect a first set of multi-modal images including at least a first image of a first modality and at least one corresponding second image of a second modality. The system also extracts using a first feature extraction subnet of the neural network, first features from the at least one first image and extracts using a second feature extraction subnet of the neural network, second features from the at least one second image. The first features are compared with the second features to estimate a domain-invariant embedding loss of extracted features of the first set of multi-modal images and the first features and second features are also submitted to a HomographyNet module of the neural network to estimate a homography loss of the extracted features of the first set of multi-modal images. The system trains the neural network by training the first feature extraction subnet, and the second feature extraction subnet of the neural network and the HomographyNet to jointly minimize a multi-objective loss function including the domain-invariant embedding loss and the homography loss.

Some example embodiments also provide a non-transitory computer readable medium having stored thereon computer executable instructions which when executed by a computer, cause the computer to perform a method for training a neural network for extracting domain-invariant features suitable for image registration. In this regard, the method comprises collecting a set of multi-modal images including at least a first image of a first modality and at least one corresponding second image of a second modality different from the first modality. The method further comprises extracting first features from the at least one first image using a first feature extraction subnet of the neural network, and extracting second features from the at least one second image using a second feature extraction subnet of the neural network. The method further comprises comparing the first features with the second features to estimate a domain invariant embedding loss of extracted features of the set of multi-modal images and submitting the first features and the second features to a HomographyNet of the neural network to estimate a homography loss of the extracted features of the second set of multi-modal images. The method further comprises training the first feature extraction subnet, the second feature extraction subnet of the neural network and the HomographyNet to jointly minimize a multi-objective loss function including the domain invariant embedding loss and the homography loss.

BRIEF DESCRIPTION OF THE DRAWINGS

The presently disclosed embodiments will be further explained with reference to the following drawings. The drawings shown are not necessarily to scale, with emphasis instead generally being placed upon illustrating the principles of the presently disclosed embodiments.

FIG. 1G illustrates one example of a multi-objective loss function utilized for training the neural network of FIG. 1A, according to some example embodiments;

Figure 1A:
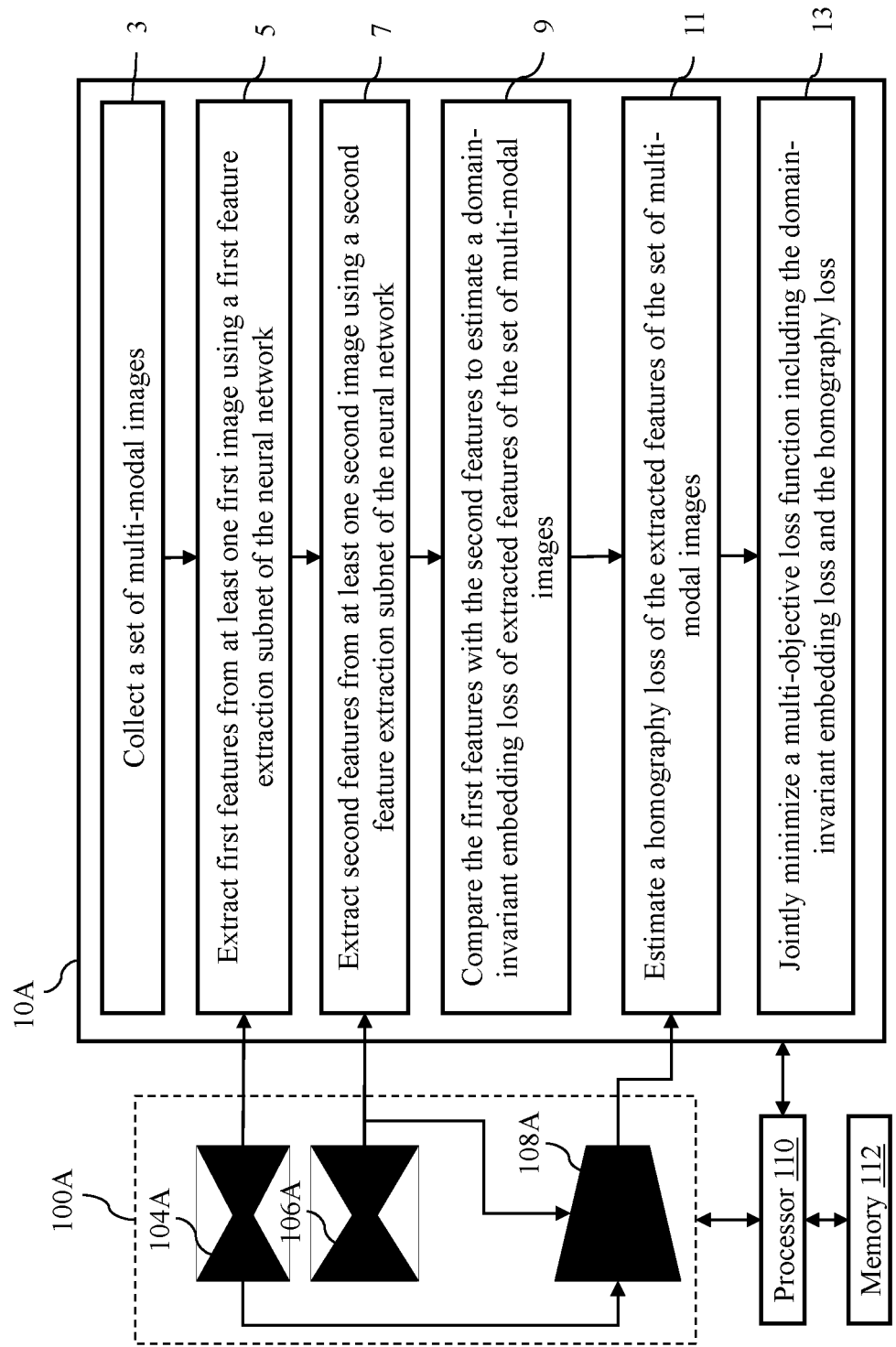
FIG. 1A illustrates an exemplar method of training a neural network for predicting domain-invariant features of multi-modal images, according to some example embodiments.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicate like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

Image registration is the process of transforming different sets of data into one coordinate system. Data may be multiple photographs, data from different sensors, times, depths, or viewpoints. It is used in computer vision, medical imaging, aerial photography, remote sensing (cartography updating), and compiling and analyzing images and data from satellites. For example, images of a three-dimensional scene taken from different view angles with different illumination spectral bands can potentially capture rich information about the scene, provided that those images can be efficiently fused. Registration of those images is a crucial step for successful fusion and/or to compare or integrate the data obtained from these different measurements.

Application of image registration methods for registering multi-modal images i.e., when images are from different domains, is a cumbersome task. Images of a scene may be of different modalities when they are obtained from differing platforms and sensors and/or using different imaging techniques. Modality of an image may be governed by the measured spectrum of light in that image. Generating a full optical image (or an artificial optical image) from a non-optical image of different modality requires a very large dataset for training a neural network and/or a complex architecture of the neural network. It has been realised that conventional image registration techniques cannot be applied directly to images of different modalities. Example embodiments described herein provide image registration techniques that align multi-modal images based on features common for the different modalities. Such features may be referred to as domain-invariant features. Having these domain-invariant features extracted from images of different modalities, the feature matching can be performed directly. In this regard, example embodiments provide a neural network that can provide such domain invariant features suitable for image registration from multi-modal images. Obtaining such a robust neural network that can provide the domain invariant features for image registration from multi-modal images requires a robust design of the subnets of the neural network and a novel way of training such a neural network.

FIG. 1A illustrates an exemplar method 10A of training a neural network 100A for predicting domain-invariant features of multi-modal images, according to some example embodiments. The method 10A may be executed by a system for training the neural network. In some example embodiments, the system may comprise suitable circuitry for data acquisition, processing data, data transmission, and control of one or more components. The processing circuitry may be realised by one or more processors 110 and a memory 112. The memory 112 may store executable instructions that may be executed by the one or more processors 110. Additionally or optionally, in some example embodiments, the system may also comprise the neural network such as the neural network 100A. The neural network 100A may comprise a plurality of subnets each configured to carry out some or a certain functionality of the neural network 100A. For example, according to some example embodiments, the neural network 100A may comprise a first subnet 104A, a second subnet 106A, a third subnet 108A. According to some example embodiments, the third subnet 108A may be a HomographyNet. Fewer or more subnets may be chosen as per the intended application and need.

The method 10A comprises collecting 3 a set of multi-modal images. In this regard, the system 100A may be coupled to a plurality of sensors providing images of a scene and/or one or more data storages storing image data of the scene procured from a plurality of sensors. Regardless of the source of the images, it may be contemplated that the collected set of multi-modal images include images of different modalities of the scene. According to some example embodiments, images of the scene may be of different modalities when they are obtained from differing platforms and sensors and/or using different imaging techniques. Some examples of images with different modalities include optical color images, optical gray-scale images, depth images, infrared images, and SAR images. Modality of an image is mainly governed by the measured spectrum of light in the image. For example, optical sensors typically operate within visible light spectrum, whereas radars typically operate within the microwave spectrum. Therefore, optical images display colors (e.g., red, green, blue) of a scene, whereas radar images display materials (e.g., water, metal, soil) of a scene.

According to some example embodiments, the processor 110 may collect at least a first image and at least a second image as the set of multi-modal images. The first image may be of a first modality and the second image may be of a second modality different from the first modality. For example, and without limitation, the first image may be an optical image while the second image may be a SAR image. The processor 110 may obtain first features corresponding to the first image and second features corresponding to the second image. Towards this end, the processor 110 may invoke a first feature extraction subnet 104A to extract 5 the first features from the first image and a second feature extraction subnet 106A to extract 7 the second features from the second image. The first and second features may be common to the first modality and the second modality. In other words, first and second features may be domain invariant features for the first image and second image, respectively.

Since the neural network 100A is not trained so far, the extracted first features and second features may not be completely domain invariant for the first and second images. As such, the training phase needs to take into consideration the quantum of domain invariant loss corresponding to the extracted first and second features. Towards this end, the method 10A comprises comparing 9 the first features with the second features to estimate a domain-invariant embedding loss of extracted features of the set of multi-modal images. A detailed description for the computation of domain invariant embedding loss of the extracted features is provided next.

Figure 1B:
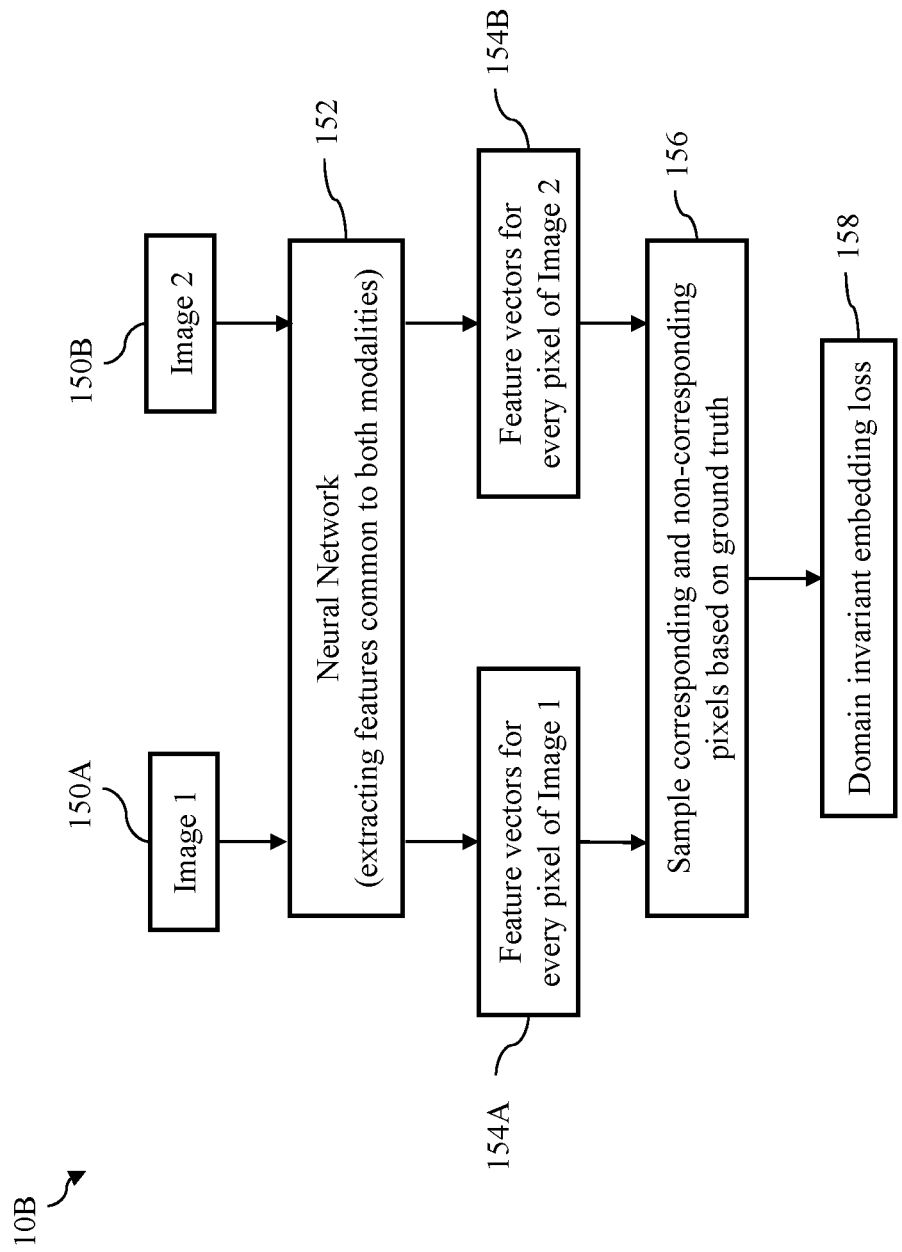
FIG. 1B illustrates a process for computing domain invariant embedding loss between a pair of multi-modal images, according to some example embodiments.

FIG. 1B illustrates a process 10B for computing domain invariant embedding loss between a pair of multi-modal images, according to some example embodiments. As for the embedding loss for domain-invariant features, it may be defined as $y*d(p,q)+(1-y)*max(0, C-d(p,q))$, where C is a manually tuned constant, d is distance defined for vectors such as the Euclidean distance, p represents feature vectors for pixels in the first image and q represents feature vectors for pixels in the second image, $y=1$ if p, q are feature vectors of corresponding points and $y=0$ if p, q are feature vectors of non-corresponding points. With this embedding loss, $d(p,q)$ can then be used as similarity measure for feature matching, because the network is to be trained to generate features p, q such that $d(p,q)$ is small if p corresponds to q and $d(p,q)$ is large if p does not correspond to q.

A pair of multi-modal images 150A, 150B may be collected by a processor (such as the processor 110 of FIG. 1A) as Image 1 and Image 2. The processor submits the pair of multi-modal images 150A, 150B to the neural network (such as the neural network 100A) for extracting 152 features common to both the modalities (i.e., domain invariant features). The neural network provides feature vectors 154A, 154B corresponding to every pixel in the first image 150A and second image 150B, respectively. The processor then samples 156 corresponding pixels and non-corresponding pixels between the first image and the second image based on ground truth data for the pixels. Towards this end, the processor may be coupled to a memory or a database that stores the ground truth data for the pixels. The domain invariant embedding loss is then computed 158 for the two images, based on the sampled pixels.

Referring back to FIG. 1A, the processor parallelly invokes a HomographyNet module 108A of the neural network 10A to estimate 11 the homography loss of the extracted features of the set of multi-modal images. In this regard, the HomographyNet 108A may obtain the extracted first features and second features from the first subnet 104A and the second subnet 106A of the neural network 10A. A detailed description for the estimation of homography loss of the extracted features is provided next.

Figure 1C:
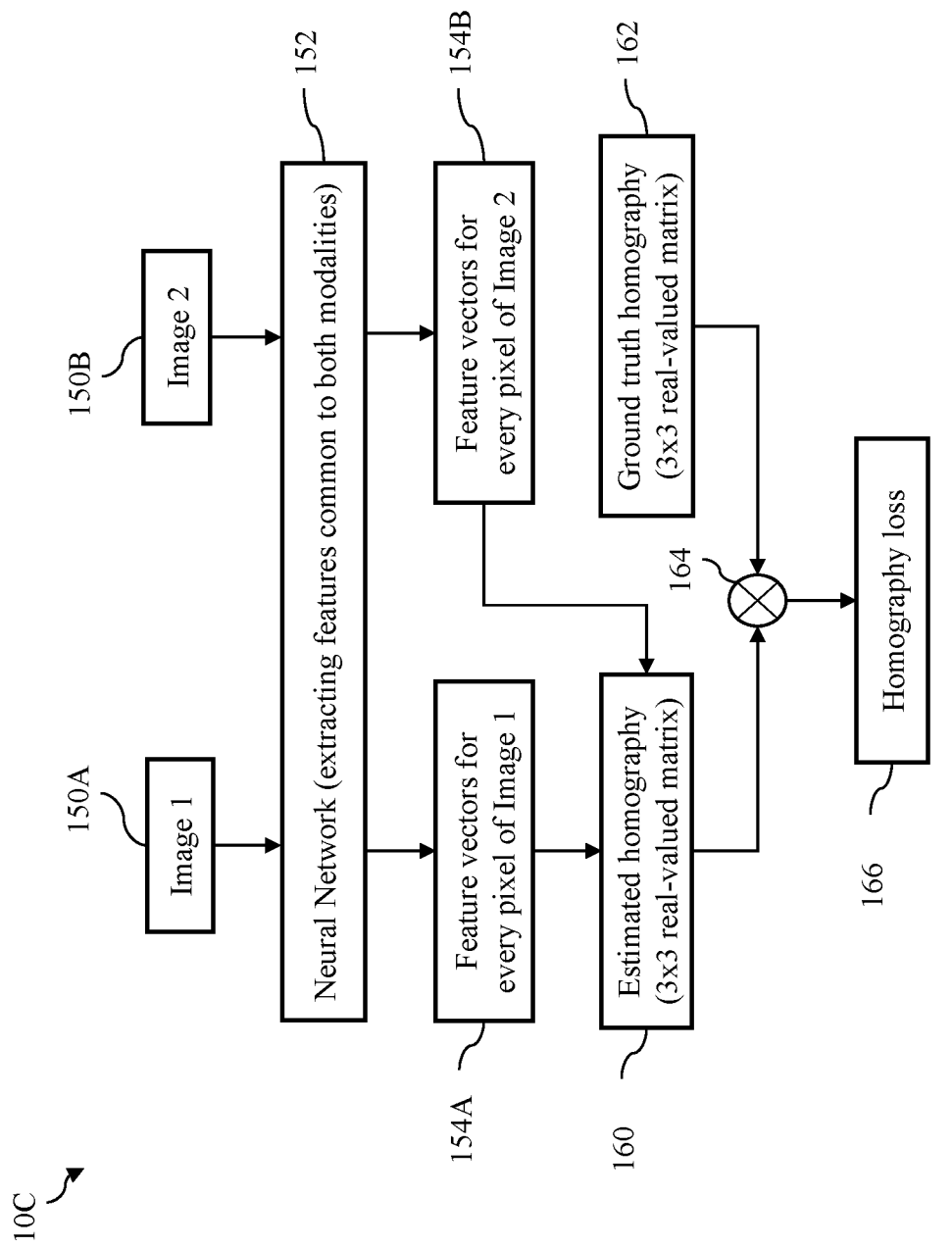
FIG. 1C illustrates a process for estimating homography loss between a pair of multi-modal images, according to some example embodiments.

FIG. 1C illustrates a process 10C for estimating homography loss between a pair of multi-modal images, according to some example embodiments. A pair of multi-modal images 150A, 150B may be collected by a processor (such as the processor 110 of FIG. 1A) as Image 1 and Image 2. The processor submits the pair of multi-modal images 150A, 150B to the neural network (such as the neural network 100A) for extracting 152 features common to both the modalities (i.e. domain invariant features). The neural network provides feature vectors 154A, 154B corresponding to every pixel in the first image 150A and second image 150B, respectively. Using the extracted feature vectors of the pair of multi-modal images (150A, 150B), the processor estimates 160 the homography between the pair of multi-modal images as a 3×3 real-valued matrix. The estimation of homography is discussed later with reference to FIG. 1D. The processor also obtains 162 ground truth homography data as a 3×3 real-valued matrix, for example from a memory or a database. The processor compares 164 the estimated homography at step 160 and the obtained ground truth homography data at step 162 to estimate the homography loss 166 for the extracted features.

Figure 1D:
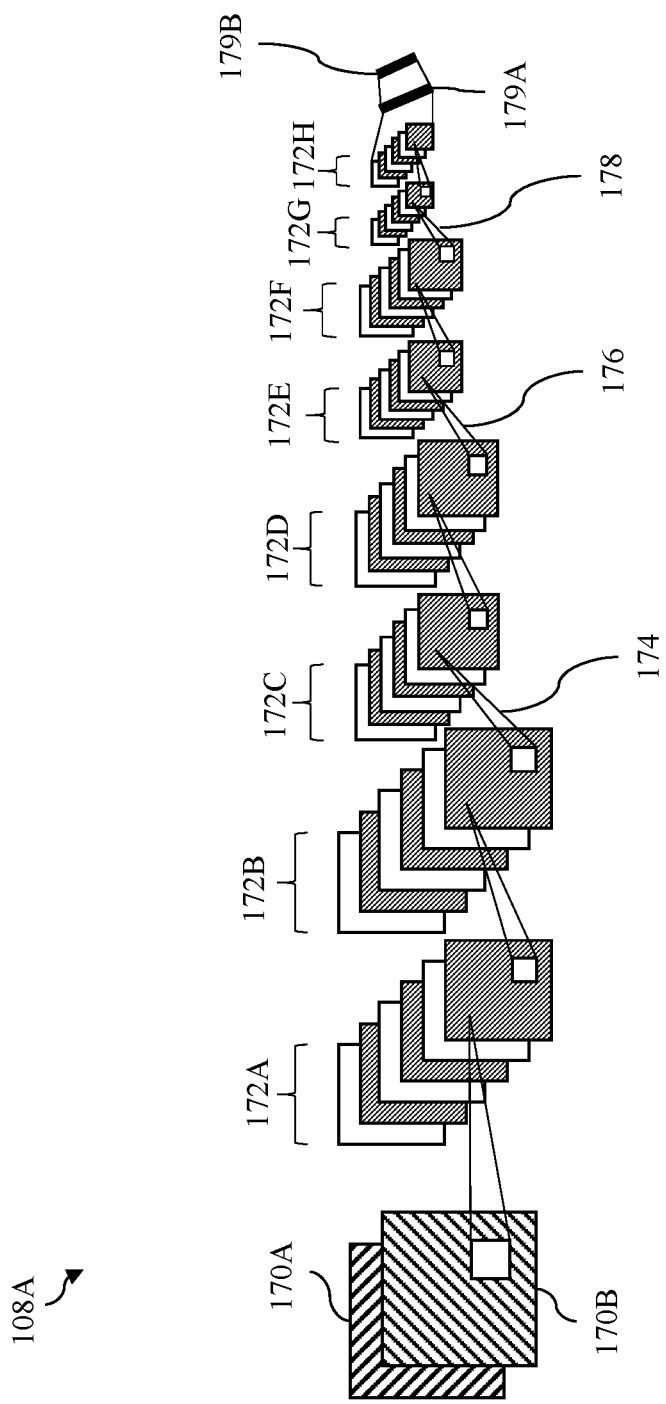
FIG. 1D illustrates an exemplar structure of the HomographyNet of the neural network of FIG. 1A, according to some example embodiments.

FIG. 1D illustrates an exemplar structure of the HomographyNet 108A of the neural network 100A of FIG. 1A, according to some example embodiments. In some example embodiments, the HomographyNet is a Deep Convolutional Neural Network (CNN) which directly produces the Homography relating two images. As illustrated, the HomographyNet is a VGG-styled network comprising eight convolution layers (172A-172H). A max pooling layer (174, 176, 178) may be used after every two convolution layers. The convolutional layers may be followed by two fully connected layers (179A and 179B). The last layer 179B contains eight elements representing eight parameters of the homography. Squared Euclidean loss may be used to train the weights of the network. The HomographyNet 108A may operate on a pair of images 170A and 170B.

The Homography relating two images (for example images 170A and 170B) may be considered as a projective transformation relating two images undergoing a rotation about the camera center. Precisely, a homography is a 3-by-3 matrix and the homography loss can be any distance defined for matrices, for example, it can be the Frobenius norm between the ground truth homography data 162 and the homography 160 estimated by the neural network. The entire homography estimation problem can be solved by a deep convolutional neural network to achieve faster turn-around and reduce computational complexities.

Figure 1E:
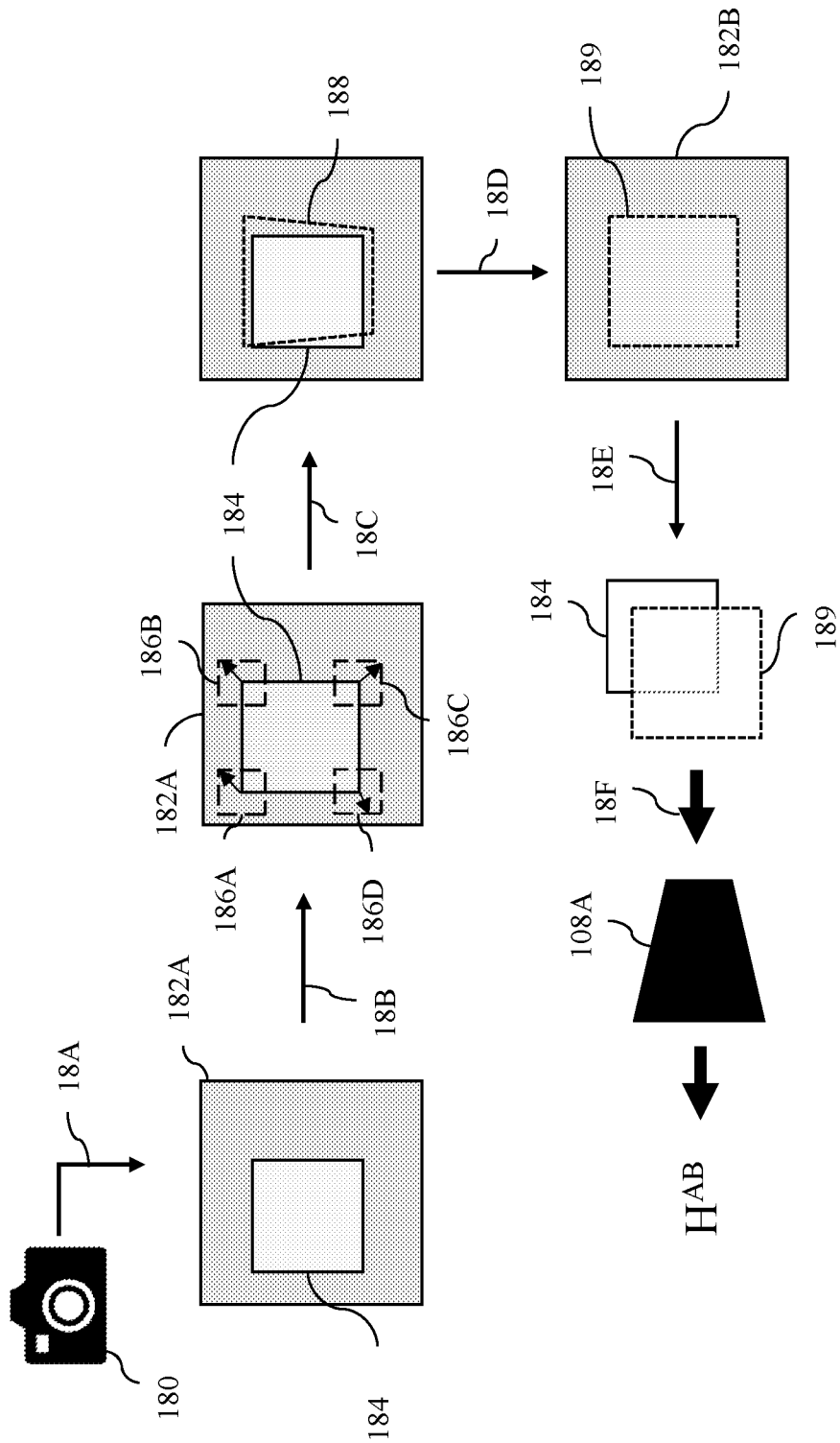
FIG. 1E illustrates a process for creating a single training example for homography estimation, according to some example embodiments.

Training deep convolutional networks from scratch may require a large amount of data. To meet this requirement, a nearly unlimited number of labeled training examples may be generated by applying random projective transformations to a large dataset of natural images. FIG. 1E illustrates a process for creating a single training example, according to some example embodiments.

An image sensor such as a camera 180 may provide 18A an image I (labeled 182A). To generate a single training example, a square patch 184 may be first cropped from the image I (182A) at position p (the borders may be avoided to prevent bordering artifacts later in the data generation pipeline). This random crop is $I_p$. Then, the four corners of patch 184 are randomly perturbed 18B by values within the range [−p, p], shown as perturbations 186A, 186B, 186C, and 186D in FIG. 1E. The four correspondences define a homography $H^{AB}$ which is computed at 18C. Then, the inverse of this homography $H^{BA}=(H^{AB})^{-1}$ is applied to the image 182A to produce image I' (labeled as 182B) at 18D. A second patch $I_p'$ (labeled as 189) is cropped from I'(182B) at position p.

The two patches, $I_p$ and $I_p'$ (184 and 189) are then stacked 18E channel wise to create a 2-channel image which is fed 18F directly into the HomographyNet 108A. The 4-point parameterization of $H^{AB}$ is then used as the associated ground-truth training label. In this way, the subnet may be trained according to the desired output using suitable input images. The control over the training pipeline provides flexibility in terms of the types of desired visual effects, the types of desired features and the granularity of the estimated homography from the neural network.

Figure 1F:
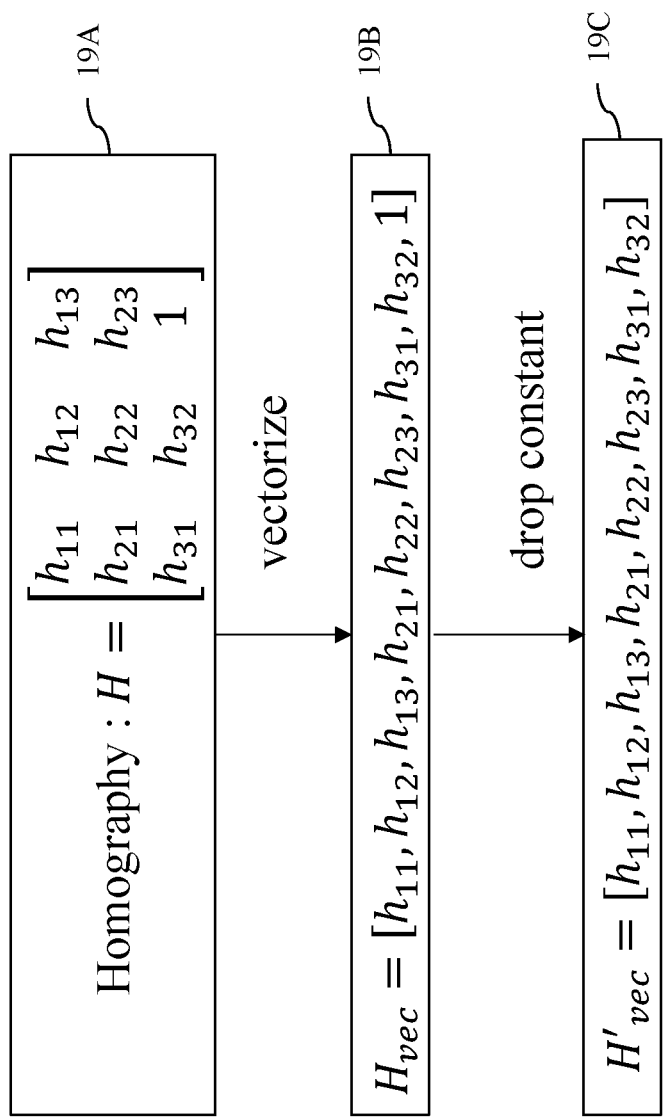
FIG. 1F illustrates parameterization of homography estimated by the HomographyNet of FIG. 1D, according to some example embodiments.

FIG. 1F illustrates parameterization of homography estimated by the HomographyNet, according to some example embodiments. A homography H is a 3-by-3 matrix 19A that transfers points from one image to the other, under the assumption that the two images are pictures of a common planar scene taken from different view angles. A 3D scene is said to be planar if the objects in the scene are of the same depth. For each point in the 3D scene that is captured in both images, let (x, y) be the pixel location of this point in the first image and let (x', y') be the pixel location of this point in the second image, then (x, y) and (x', y') is related by a homography H as (x',y',1)=H(x,y,1), where (x,y,1) and (x', y',1) are viewed as column vectors and H(x,y,1) is standard matrix-vector multiplication. Note that a common homography H applies to all pairs of corresponding pixels in the two images. For convenience in representation, the homography matrix H 19A is vectorized by concatenating rows of H into a vector H_vec 19B. Because the last element of H_vec is constant 1, the HomographyNet only need to learn the first 8 elements of H_vec, which is H'_vec 19C.

Referring back to FIG. 1A, having obtained the domain invariant embedding loss at step 9 and the homography loss at step 11 for the extracted features, the processor trains the neural network 100A by training the first feature extraction subnet 104A, the second feature extraction subnet 106A and the HomographyNet 108A of the neural network 100A to jointly minimize 13 a multi-objective loss function including the domain invariant embedding loss and the homography loss. In this regard, the processor formulates the multi-objective loss function as a function of the computed losses for the extracted features. For example, in some example embodiments, the processor may formulate the multi-objective loss function by assigning individual weights to each constituent loss.

FIG. 1G illustrates one such example of the multi-objective loss function 199 defined by N loss functions each having an assigned weight. Each loss function (192A, 192B, . . . 192N) has a corresponding assigned weight (194A, 194B, . . . 194N). The weighted loss (196A, 196B, . . . 196N) for each loss function (192A, 192B, . . . 192N) is computed and summed 198 to obtain the total loss or the multi-objective loss function 199. Some examples of the loss functions (192A, 192B, . . . 192N) include a domain invariant embedding loss of extracted features for a pair of multi-modal images, a homography loss between a pair of multi-modal images, a domain specific embedding loss of extracted features for a pair of multi-modal images and the like.

Referring back to FIG. 1A, the processor trains the subnets of the neural network 100A to jointly minimize the multi-objective loss function thus formulated. Minimizing a particular constituent loss of the multi-objective loss function comprises comparing the corresponding loss or weighted loss with a corresponding threshold. A subnet may be regarded as trained when the quantum of the corresponding loss or weighted loss is less than the respective threshold for that loss. In some other example embodiments, a subnet may be regarded as trained when the quantum of the corresponding loss or weighted loss is more than the respective threshold for that loss. In yet some other example embodiments, a subnet may be regarded as trained when the quantum of the corresponding loss or weighted loss is equal to the respective threshold for that loss.

In this way, example embodiments provide systems and methods for training the neural network 100A for predicting domain invariant features for multi-modal images. Such a trained neural network that can provide domain invariant features of acceptable accuracy for the multi-modal images may be utilized for performing image registration of the multi-modal images. Some example embodiments provide methods and systems for image registration using a neural network trained to provide such domain invariant features from a set of multi-modal images which is described next.

Figure 2A:
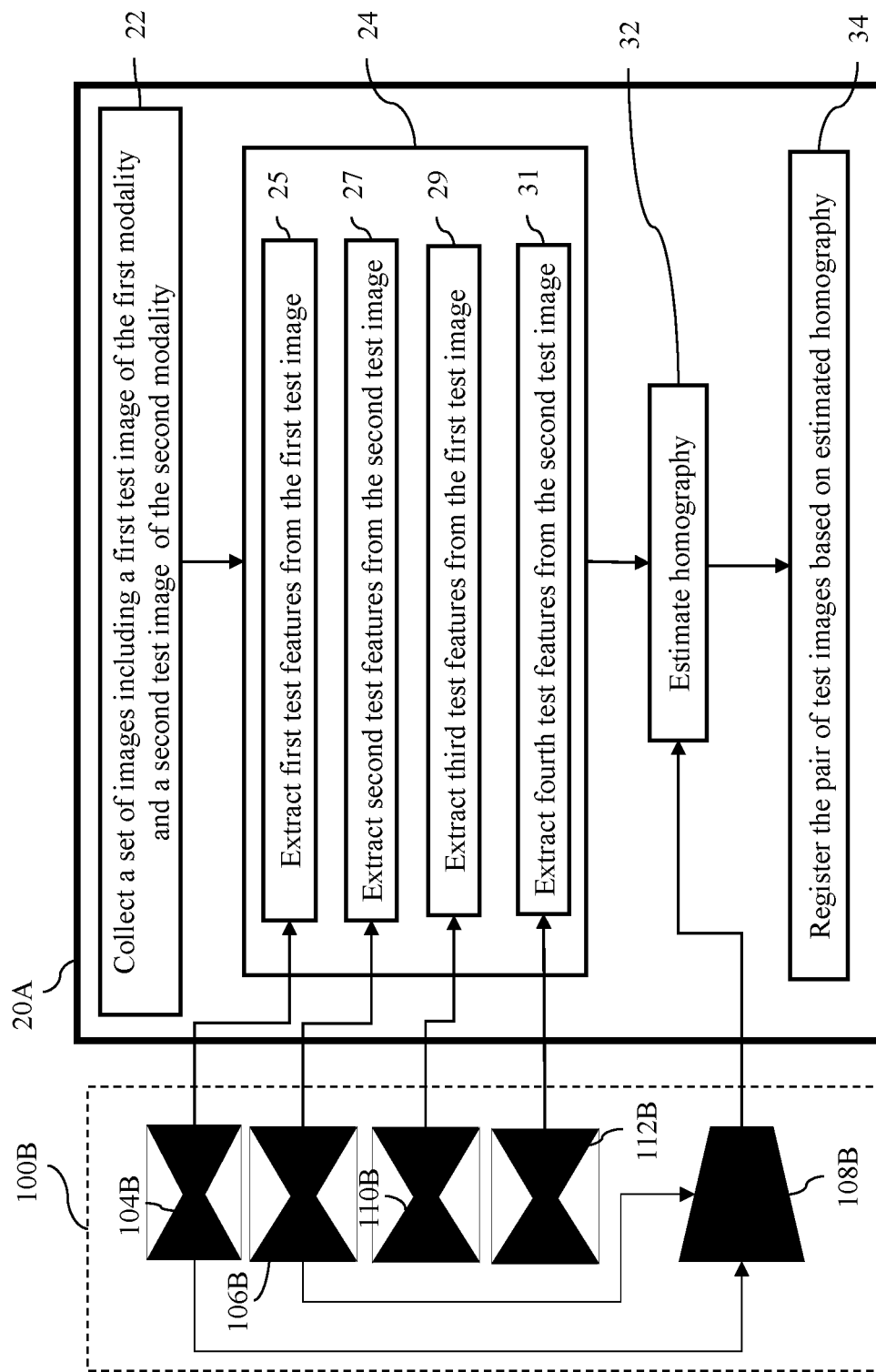
FIG. 2A illustrates a multi-modal image registration method for registering a set of multi-modal images using a trained neural network, according to some example embodiments.

FIG. 2A illustrates a multi-modal image registration method 20A for registering a set of multi-modal images using a trained neural network 100B, according to some example embodiments. The neural network 100B has been trained according to the method 10A illustrated in FIG. 1A. The registration method 20A may be executed by a suitable processing circuitry such as a processor and a memory storing instructions executable by the processor. The processor collects 22 a set of multi-modal images of a scene. According to some example embodiments, the set of images may include a first test image of a first modality and a second test image of a second modality. For example, in some example embodiments, the first test image may be a SAR image of a scene while the second test image may be an optical image of the same scene.

The processor then invokes the trained neural network 100B for feature extraction 24. In this regard, the processor may invoke the first feature extraction subnet 104B of the trained neural network 100B to extract 25 first test features from the first test image. In some example embodiments, the trained first feature extraction subnet 104B provides domain invariant features from the first test image. The processor may simultaneously or sequentially invoke the second feature extraction subnet 106B of the trained neural network 100B to extract 27 second test features from the second test image. In some example embodiments, the trained second feature extraction subnet 106B provides domain invariant features from the second test image.

In order to support keypoint matching capabilities, the trained neural network 100B may be supplemented with another set of feature extraction subnets for extracting domain specific features for each of the multi-modal images as a part of the feature extraction 24. In this regard, the processor may invoke a third feature extraction subnet 110B of the trained neural network 100B to extract 29 third test features from the first test image. In some example embodiments, the third feature extraction subnet 110B provides domain specific features from the first test image. Additionally, the processor may also invoke a fourth feature extraction subnet 112B of the trained neural network 100B to extract 31 fourth test features from the second test image. In some example embodiments, the fourth feature extraction subnet 112B provides domain specific features from the second test image.

Figure 2B:
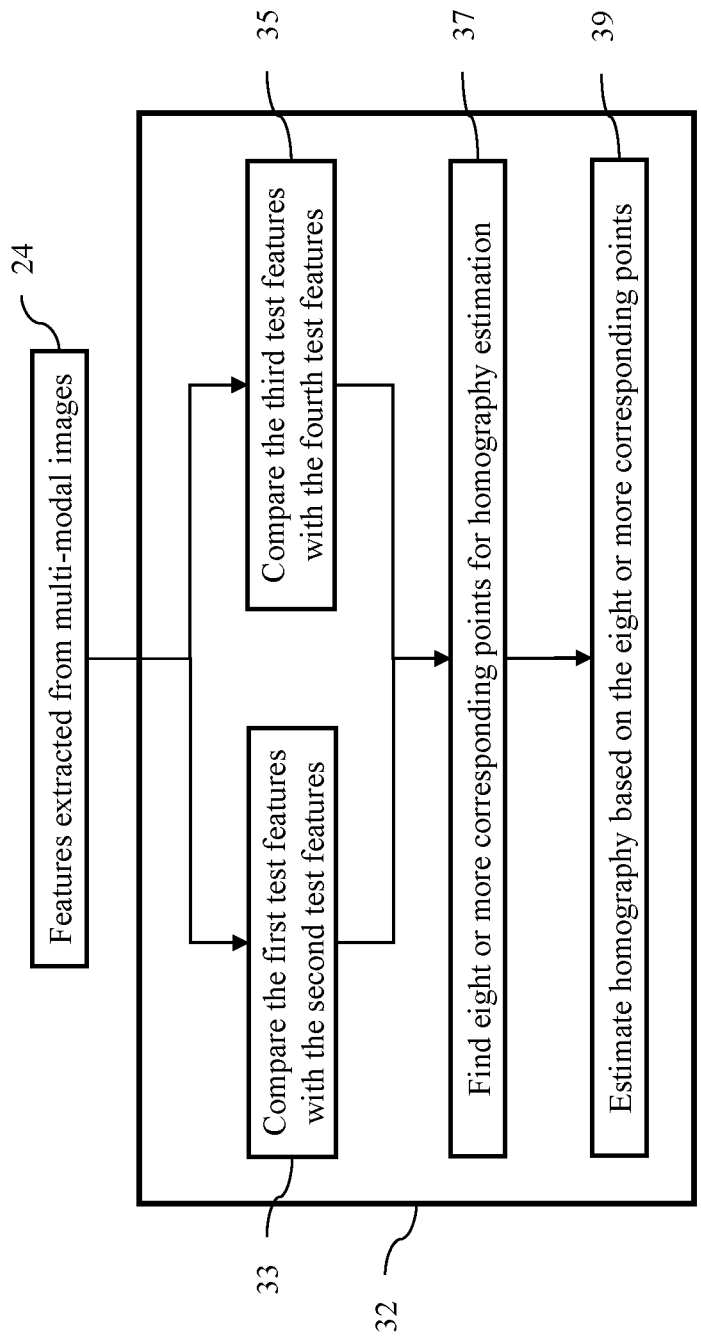
FIG. 2B illustrates an example method for estimating homography using extracted features of the set of multi-modal images, according to some example embodiments.

Having obtained the set of features from the test images at block 24, the homography relating the two test images may be estimated 32. Towards this end, some example embodiments provide that the extracted first test features and the extracted second test features may be sent to the trained HomographyNet 108B to generate an estimated homography between the first test image and the second test image. Alternatively or additionally, according to some example embodiments, to obtain a potentially more reliable homography, the processor may utilize the domain specific features in addition to the domain invariant features to estimate the homography relating the two test images. FIG. 2B illustrates an example method for estimating homography using the extracted features of the multi-modal images. From among the extracted features 24 of the multi-modal images, the processor compares 33 the extracted first test features with the extracted second test features and simultaneously compares 35 the extracted third test features with the extracted fourth test features to find 37 eight or more corresponding points for the two test images. These corresponding points are used to estimate 39 the homography. Referring back to FIG. 2A, having obtained the estimated homography from the HomographyNet and/or using the method of FIG. 2B, the processor registers 34 the first test image and the second test image based on the estimated homography.

Figure 2C:
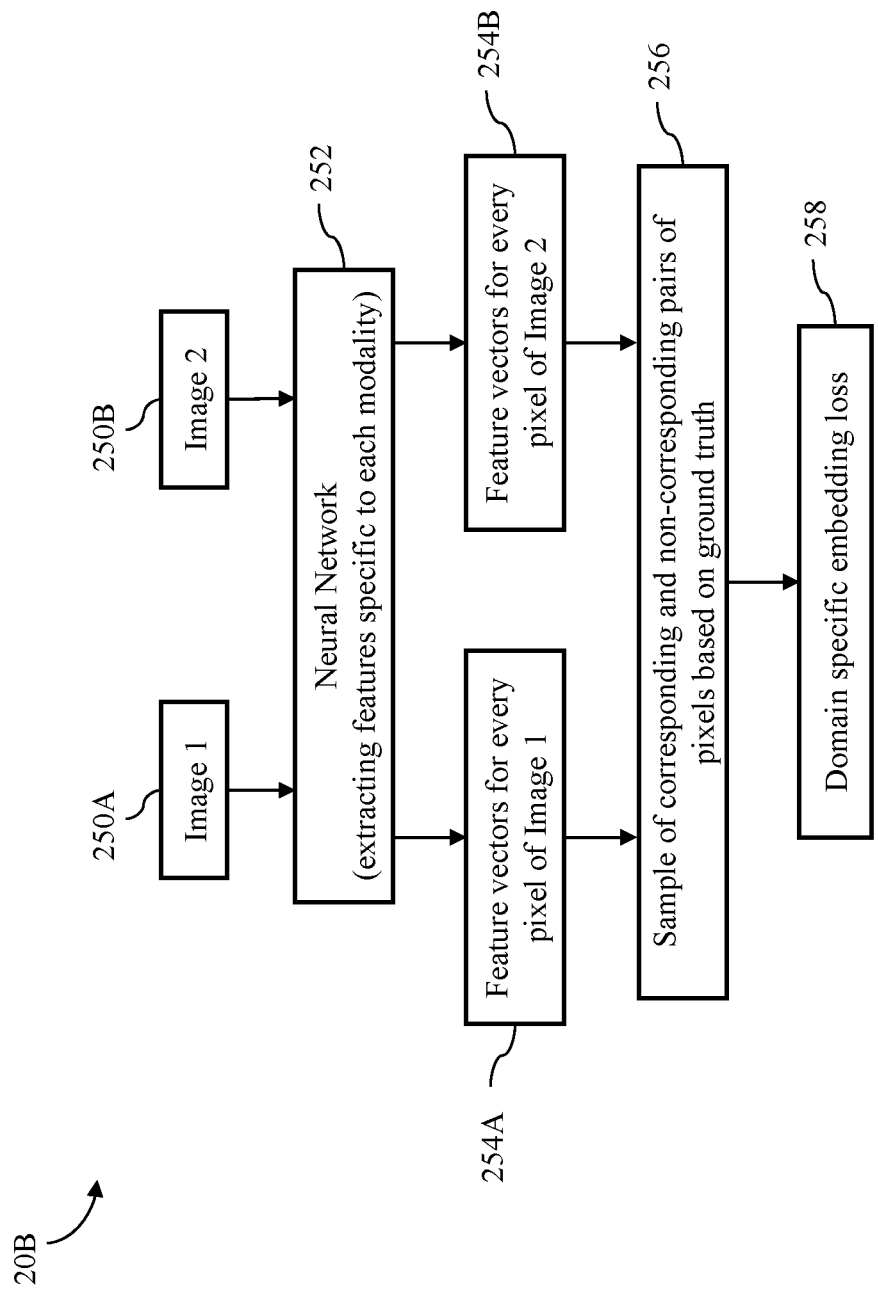
FIG. 2C illustrates a process for computing domain invariant embedding loss between a pair of multi-modal images, according to some example embodiments.

As discussed previously, in order to support keypoint matching capabilities, the neural network may be supplemented with another set of feature extraction subnets for extracting domain specific features. The domain specific features of each of the multi-modal images may be utilized to compute a domain specific embedding loss for the multi-modal images. FIG. 2C illustrates a process for computing domain invariant embedding loss between a pair of multi-modal images, according to some example embodiments. A pair of multi-modal images 250A, 250B may be collected by a processor as Image 1 and Image 2. The processor submits the pair of multi-modal images 250A, 250B to the neural network for extracting 252 features specific to each of the modalities (i.e. domain specific features). The neural network provides feature vectors 254A, 254B corresponding to every pixel in the first image 250A and second image 250B, respectively.

Domain-specific features of two images are not designed to be compared directly, because these feature vectors may contain information that is not shared among different modalities. The properties of domain-specific features depend on the embedding loss for these features vectors used during training. For example, let $p_1$ and $p_2$ be the feature vectors of a pair of pixels in the first image and let $d_1(p_1,p_2)$ denote the pairwise feature distance in the first image. Similarly, let $q_1$ and $q_2$ be the feature vectors of a pair of pixels in the second image and let $d_2(q_1, q_2)$ denote the pairwise feature distance in the second image. Then the embedding loss can be $y*D(d_1(p_1, p_2), d_2(q_1, q_2))-(1-y)*\max(0, C-D(d1(p_1, p_2), d_2(q_1, q_2)))$, where $y=1$ if $p_1$ corresponds to $q_1$ and $p_2$ corresponds to $q_2$; otherwise, $y=0$. Here, $d_i$ is a distance defined on the feature space for the first image, $d_2$ is a distance defined on the feature space for the second image, D is a distance defined on real numbers, and C is a constant. With this embedding loss, $D(d_i(p_1, p_2), d_2(q_1, q_2))$ can then be used as the similarity measure for feature matching, because the neural network is trained to generate $p_1, p_2, q_1, q_2$ such that $D(d_1(p_1, p_2), d_2(q_1, q_2))$ is small if $p_1$ corresponds to $p_2$ and $q_1$ corresponds to $q_2$ and $D(d_1(p_1, p_2), d_2(q_1, q_2))$ is large otherwise.

Referring to FIG. 2C, the processor samples 256 corresponding pixels and non-corresponding pixels between the first image 250A and the second image 250B based on ground truth data for the pixels. Towards this end, the processor may be coupled to a memory or a database that stores the ground truth data for the pixels. The domain specific embedding loss is then computed 258 for the two images, based on the sampled pixels.

Figure 3:
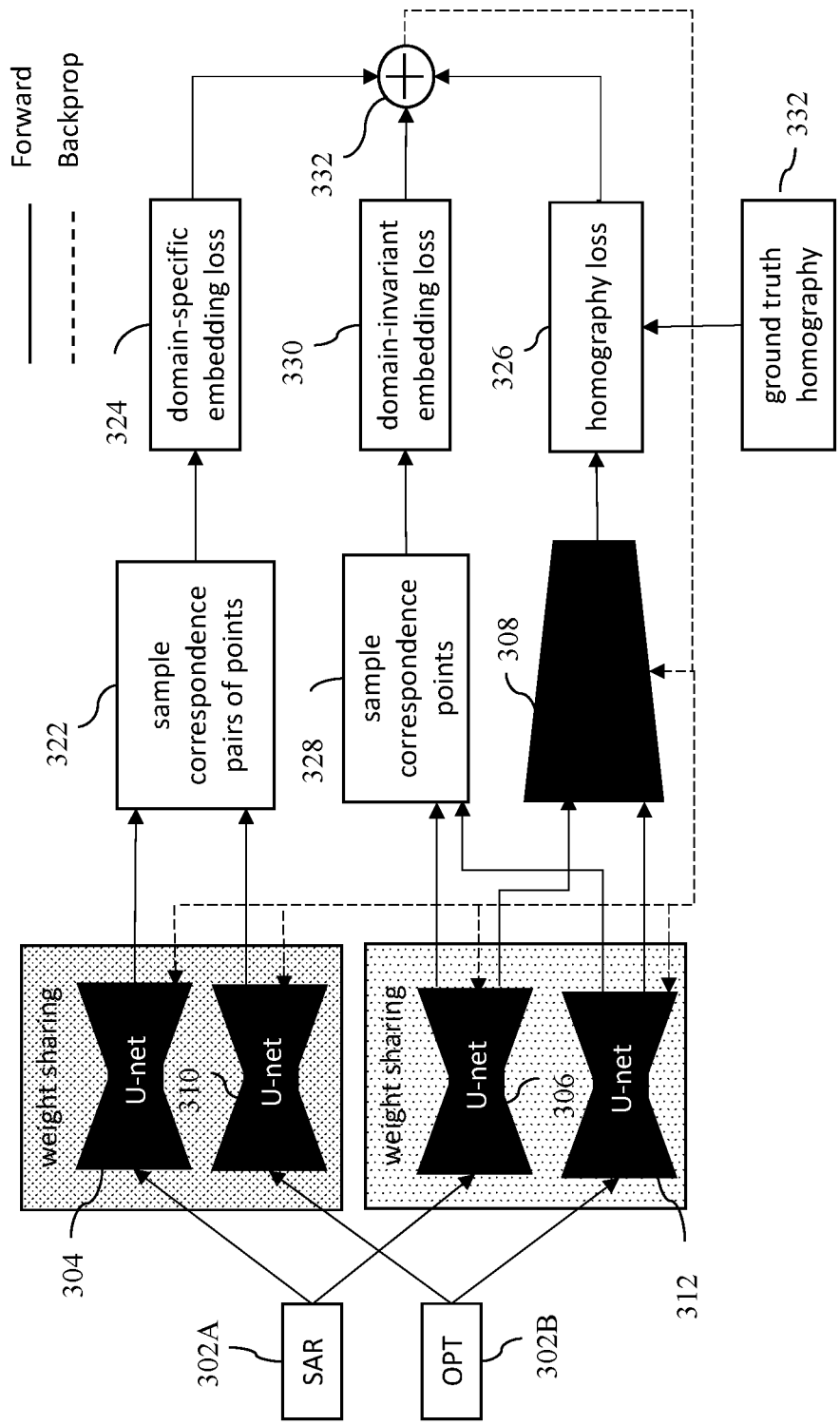
FIG. 3 illustrates a workflow describing operations of the neural network in the training pipeline and the prediction pipeline, according to some example embodiments.

FIG. 3 illustrates a workflow describing operations of the neural network in the training pipeline and the prediction pipeline, according to some example embodiments. The input to the neural network is a pair of multi-modal images, for example, a SAR image 302A and an optical image 302B. Two auto-encoders, U-net 304 and U-net 306, are used to generate per-pixel features for the SAR image 302A. Per-pixel feature means that a high-dimensional feature vector is generated for each pixel of the image. Similarly, U-net 310 and U-net 312 are used to generate per-pixel features for the optical image 302B. U-net 304 and U-net 310 have the same structure and share weights, i.e., they are identical and they represent a feature extraction function that extracts domain-specific features. The sampling module 322 samples pairs of corresponding pixels as well as pairs of non-corresponding pixels. Specifically, it first randomly selects a pair of pixels in the SAR image, then according to the ground truth correspondence, it either finds the two corresponding pixels (for the case of sampling corresponding pairs) or randomly selects two non-corresponding pixel (for the case of sampling non-corresponding pairs) in the optical image. Then the domain-specific feature vectors of these sampled pairs are sent to module 324 to compute the domain-specific embedding loss. Similarly, U-net 306 and U-net 312 are identical and they represent a feature extraction function that extracts domain-invariant features. The sampling module 328 samples corresponding pixels as well as non-corresponding pixels. Specifically, it first randomly selects a pixel in the SAR image, then according to the ground truth correspondence, it either finds the corresponding pixel (for the case of sampling corresponding pixels) or randomly selects a non-corresponding pixel (for the case of sampling non-corresponding pixels) in the optical image. Then the domain-invariant feature vectors of these sampled pixels are sent to module 330 to compute the domain-invariant embedding loss. In addition, the generated per-pixel domain invariant feature vectors are also sent to the HomographyNet 308 for learning the homography. The output of the HomographyNet 308 is the estimated homography. Together with the ground truth homography 332, the homography loss is computed at module 326. The total loss is obtained by summing up 332 the domain-specific loss (output of 324), the domain-invariant loss (output of 330), and the homography loss (output of 326). The goal is to estimate the weights in the four U-nets 304 310 306 312 and the weights in the HomographyNet 308 by minimizing the total loss (output of the summation operation 332).

Figure 4:
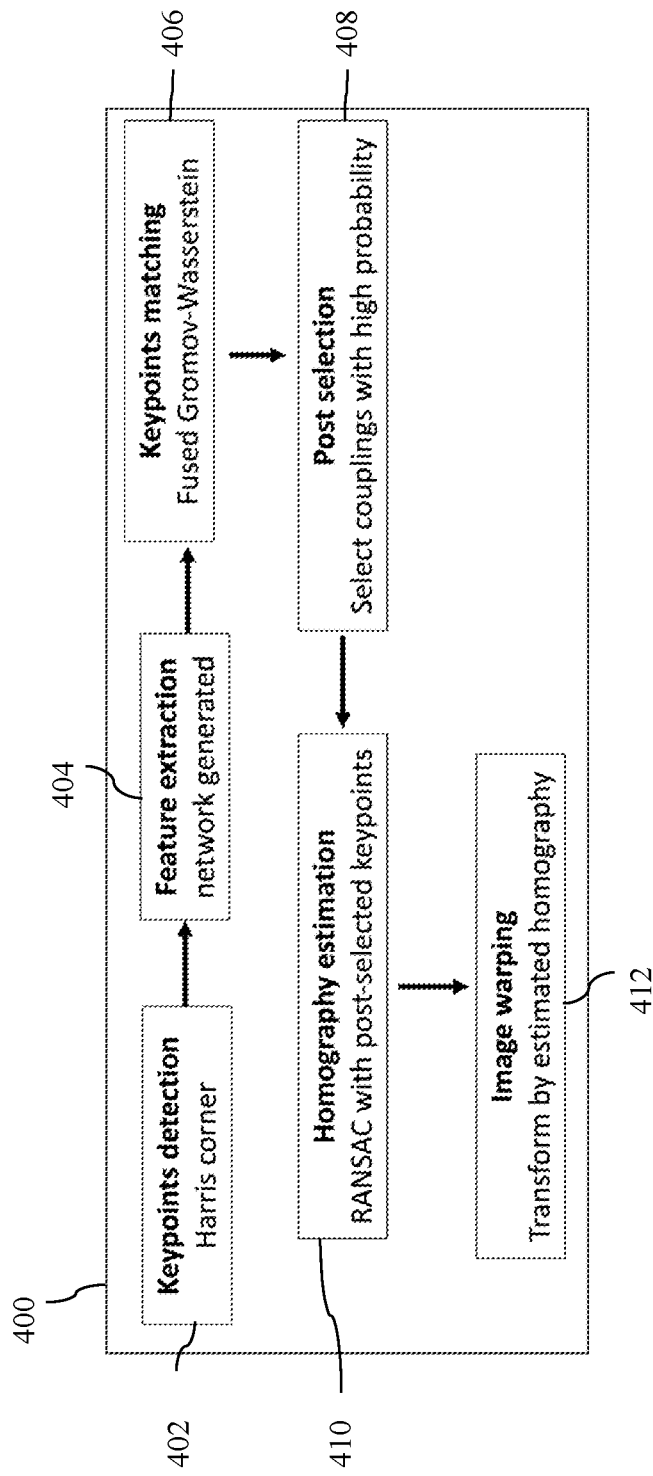
FIG. 4 illustrates a workflow depicting image alignment via optimal transport using the neural network of FIG. 3, according to some example embodiments.

FIG. 4 illustrates a workflow depicting image alignment via optimal transport using the neural network of FIG. 3, according to some example embodiments. After the network of FIG. 3 is trained, the trained U-nets 304, 310, 306, 312 can be used to perform per-pixel feature extraction 404 for the two images to be aligned. A standard keypoints detection method 402 such as Harris corner is used to select pixels whose feature vectors, including both domain-invariant and domain-specific, are used to compute the two cost terms for fused Gromov-Wasserstein distance with uniform marginal distributions, which serves as keypoints matching 406. Specifically, one cost term attempts to match pairs of keypoints in one image to pairs of keypoints in the other image, such that the ground cost distance of domain-specific features extracted from the pair in the first image is similar to the ground cost of domain-specific features extracted from the pair in the second image for corresponding pairs; the other cost term attempts to match keypoints in one image to keypoints in the other image, such that the domain-invariant features extracted from the point in the first image is similar to domain-invariant features extracted from point in the second image for corresponding points. The degree of similarity may be adjudged with respect to a corresponding threshold value for each of the ground costs. Furthermore, the corresponding thresholds may be configurable according to need. Computing the fused Gromov-Wasserstein distance involves finding an optimal coupling, which gives the probability that each keypoint in one image corresponds to the keypoint in the other image, that minimizes the combination of the two cost terms. A post selection process 408 is performed to select the estimated corresponding points with high probability according to the optimal coupling. The number of points to be selected may be user-defined and the threshold defining high probability may also be configurable. The selected corresponding points are then used to estimate 410 the homography for example by the RANSAC algorithm. Finally, the estimated homography is used to warp 412 one image to match the other image.

Figure 5A:
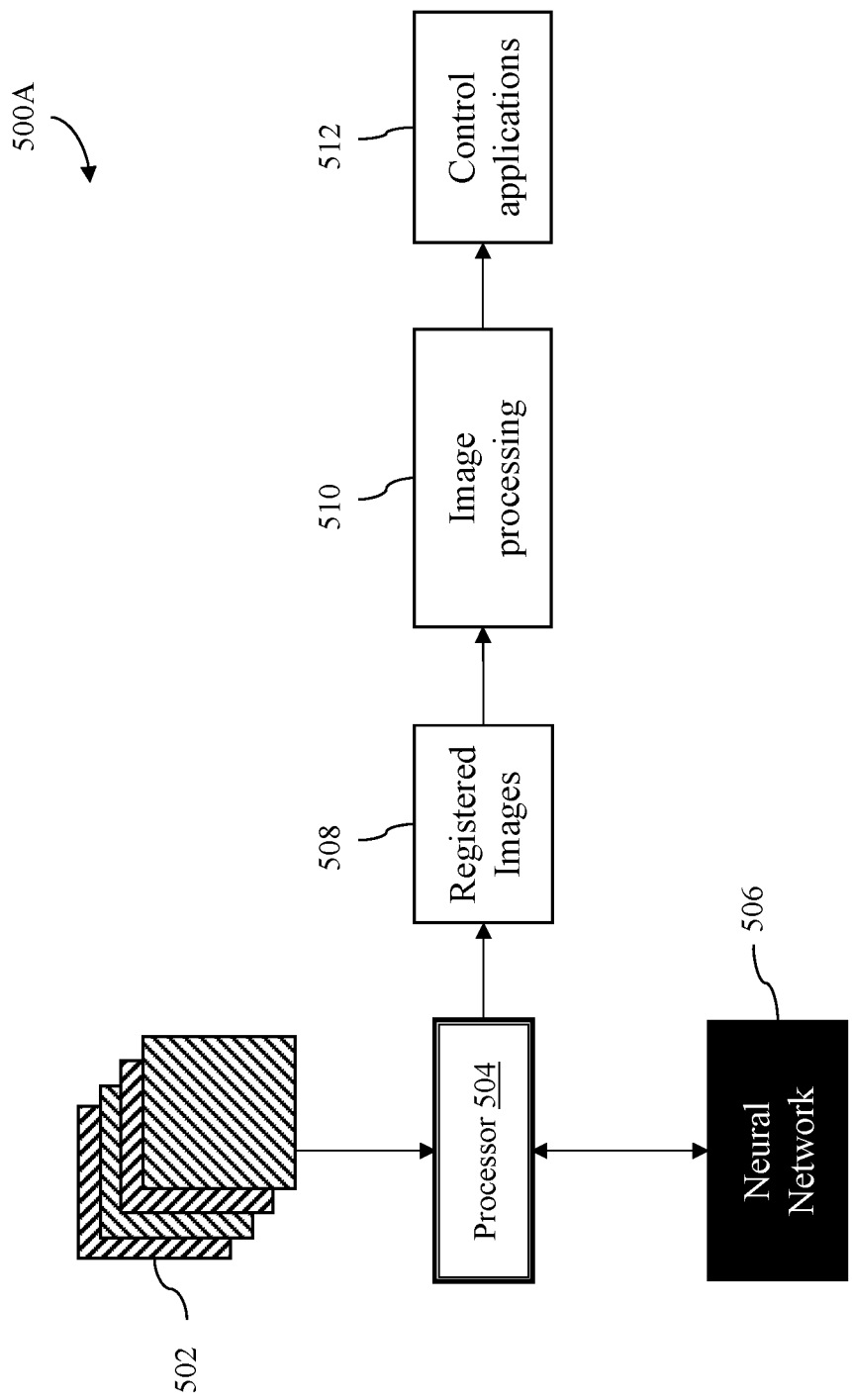
FIG. 5A illustrates a block diagram depicting application of the neural network for control tasks, according to some example embodiments.

FIG. 5A illustrates a block diagram 500A depicting application of the trained neural network for control tasks, according to some example embodiments. A set of multi-modal images 502 may be obtained by the processor 504 and in conjunction with the neural network 506, the processor may perform image registration for the set of multi-modal images 502 to generate registered images 508. These registered images 508 may further be processed 510 internally by the processor 504 or by one or more external processors to generate control commands for one or more control applications 512. Thus, the processor 504 aids in aligning the set of multi-modal images 502 which otherwise could not have been suitably processed at block 510 for the control applications 512. The control applications 512 may include for example controlling a robot in an assembly line where input images are captured in different modalities. In some example embodiments, the control applications 512 may include controlling one or more operations in a vehicle having multiple image sensors (CCD, LiDAR) for capturing road data. The vehicle may be manually driven, fully autonomous or semi-autonomous. In yet some other example embodiments, the control applications 512 may include enhancing some images of a first modality of a scene using some images of a second modality of the scene.

Figure 5B:
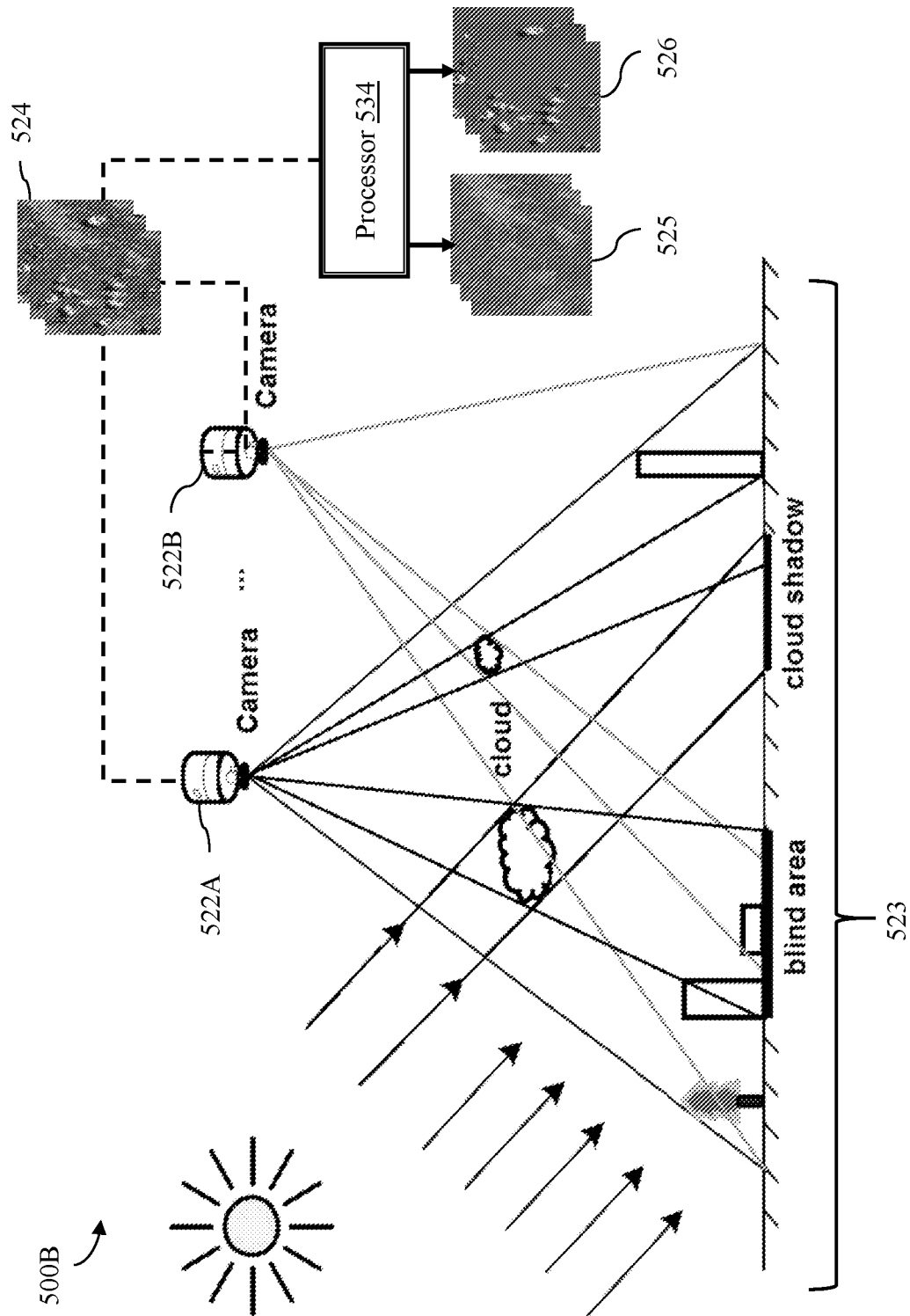
FIG. 5B is a schematic illustrating a system for enhancing images using the image registration method of FIG. 2A, according to some example embodiments.

FIG. 5B is a schematic illustrating a system 500B for enhancing images using the image registration method of FIG. 2A, according to embodiments. Sensors 522A, 522B, i.e., an image sensor in a satellite, sequentially or non-sequentially, capture a set of input images 524 of a scene 523. It may be contemplated that in some example embodiments, the scene appearing in the input images 524 may be approximated as planar. For example, the image sensors may not be close to the scene (as in case of satellite/aircraft based images) and/or the objects in the scene do not have significantly different heights as appearing in the input images 524 and/or the images are of low-resolution. The cameras 522A, 522B may be in a moving airplane, satellite or some other sensor carrying device allowing pictures to be taken of the scene 523. Further, the number of sensors 522A, 522B are not limited in number, and the number of sensors 522A, 522B may be based upon a specific application.

The input images 524 may be obtained by a single moving sensor at time steps t, or by multiple sensors 522A, 522B taken at different times, different angles and from far away distances. Sequential acquisition reduces memory requirements to store the images 524, because the input images 524 can be processed online as they are acquired by one or more sensor 522A, 522B and received by a processor 534. The processor 534 may be similar to the processor 504 of FIG. 5A and may be coupled with the neural network 506 of FIG. 5A, amongst other components. The input images 524 can overlap to facilitate registering the images with each other.

The input images 524 can be gray scale images or color images or SAR images. In addition, the input images 524 can be multi-temporal images, multi-modal images, or multi-angle view images acquired sequentially.

The one or more sensor 522A, 522B can be arranged in a moving space or airborne platform (satellite, airplane or drone), and the scene 523 can be ground terrain or some other scene located on the surface or above the surface of the earth. The scene 523 can include occlusions due to structures in the scene 523, such as buildings, and clouds between the scene 523 and the one or more sensor 522A, 522B. At least one goal of the present disclosure, among other goals, may be to produce a set of enhanced output images 525, without occlusions. As a by-product, the system also produces a set of sparse images 526 including just the occlusions, e.g., the clouds.

Figure 6:
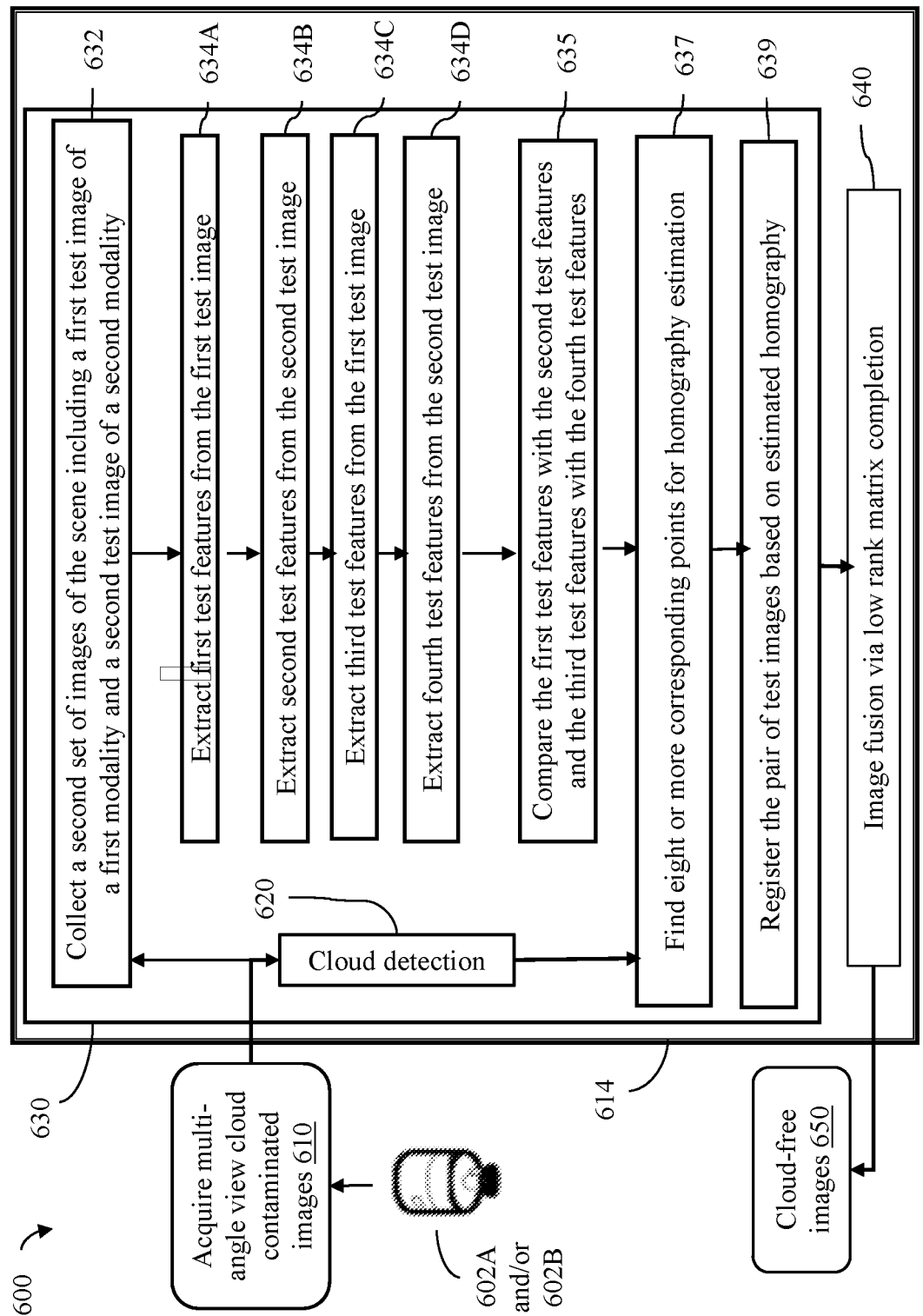
FIG. 6 is a flow diagram of the system of FIG. 5B for cloud-removal application, according to some example embodiments.

FIG. 6 is a flow diagram of the system of FIG. 5B that provides details of forming a matrix using vectorized aligned multi-angled view multi-modal images and the matrix completion, according to some example embodiments. As shown in FIG. 6, the system operates in a processor 614, which may be coupled to the sensors 602A, 602B, either electrically or wirelessly.

The set of input images 604 are acquired 610 by the processor 614 either directly or indirectly, e.g., the image may be acquired by sensors 602A, 602B, i.e. a camera, a video camera, or can be obtained by other means or from other sources, e.g., a memory transfer, or wired or wireless communication. It is possible, a user interface in communication with the processor and the computer readable memory, can acquire and store the set of multi-angled view multi-modal images in the computer readable memory upon receiving an input from a surface of the user interface by a user. The images 604 may comprise multi-angled view images of a three dimensional planar scene, for example, of a geographic area captured in different modalities.

The multi-modal images 604 may be aligned to a target view angle of the scene based on the registration process illustrated in FIG. 2A and FIG. 5A. Such an alignment of the multi-angled view images 604 may be performed to form a set of aligned multi-angled view multi-modal images representing a target point of view of the scene. In example embodiments where these images 604 correspond to aerial images of a scene, at least one aligned multi-angled view image of the multi-angled view multi-modal images, may have missing pixels due to the clouded area.

Cloud detection 620 may be performed based on the intensity and total variation of small patches, i.e., total variation thresholding. Specifically, by dividing an image into patches, and computing an average intensity and total variation of each patch, each patch can be labeled as cloud, or cloud shadow, under specific conditions. The detected regions with a small area can be then removed from the cloud mask, since they are likely to be other flat objects such as building surfaces or shadows of buildings. Finally, the cloud mask can be dilated so that the boundary of the cloud-covered areas with thin clouds are also covered by the cloud mask. Having obtained a set of cloud contaminated images in the manner described above, the goal is then to replace the missing pixels in the contaminated area with pixels depicting corresponding portions of the scene obtained from other images within the set in which those portions are not contaminated. This requires alignment of the set of images which in turn needs homography relating pairs of images.

In this regard, the method 600 of FIG. 6 provides collecting a set of multi-modal images of the scene. For each portion of the scene, at least one of the images from the image set contains non-contaminated pixels for that portion of the scene. Any image from the image set can be selected as the target image, i.e., image with the target view angle, then all other images from the image set will be aligned with this target image. Each time a test image is selected to align with the target image. Using the trained neural network, first test features may be extracted 634A from the target image and second test features may be extracted 634B from the test image. Additionally, using the neural network, third test features may be extracted 634C from the target image and fourth test features may be extracted 634D from the test image. The method also comprises comparing 635 the first test features with the second test features and the third test features with the fourth test features to find 637 eight or more corresponding points for homography estimation. The target image and the test image are then registered/aligned using the estimated homography. This process is repeated until all images in the image set are aligned with the target image.

After image alignment, a collection of images that are aligned are available. The aligned images contain missing pixels due to cloud contamination or occlusion such that, image fusion can be accomplished using the matrix completion technique, assuming that the matrix formed by concatenating vectorized well-aligned images has low rank 640. Low-rank matrix completion estimates the missing entries of a matrix under the assumption that the matrix to be recovered has low rank. Since direct rank minimization is computationally intractable, convex or nonconvex, relaxation can be usually used to reformulate the problem. Thus, the cloud free images are generated 650.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Figure 7:
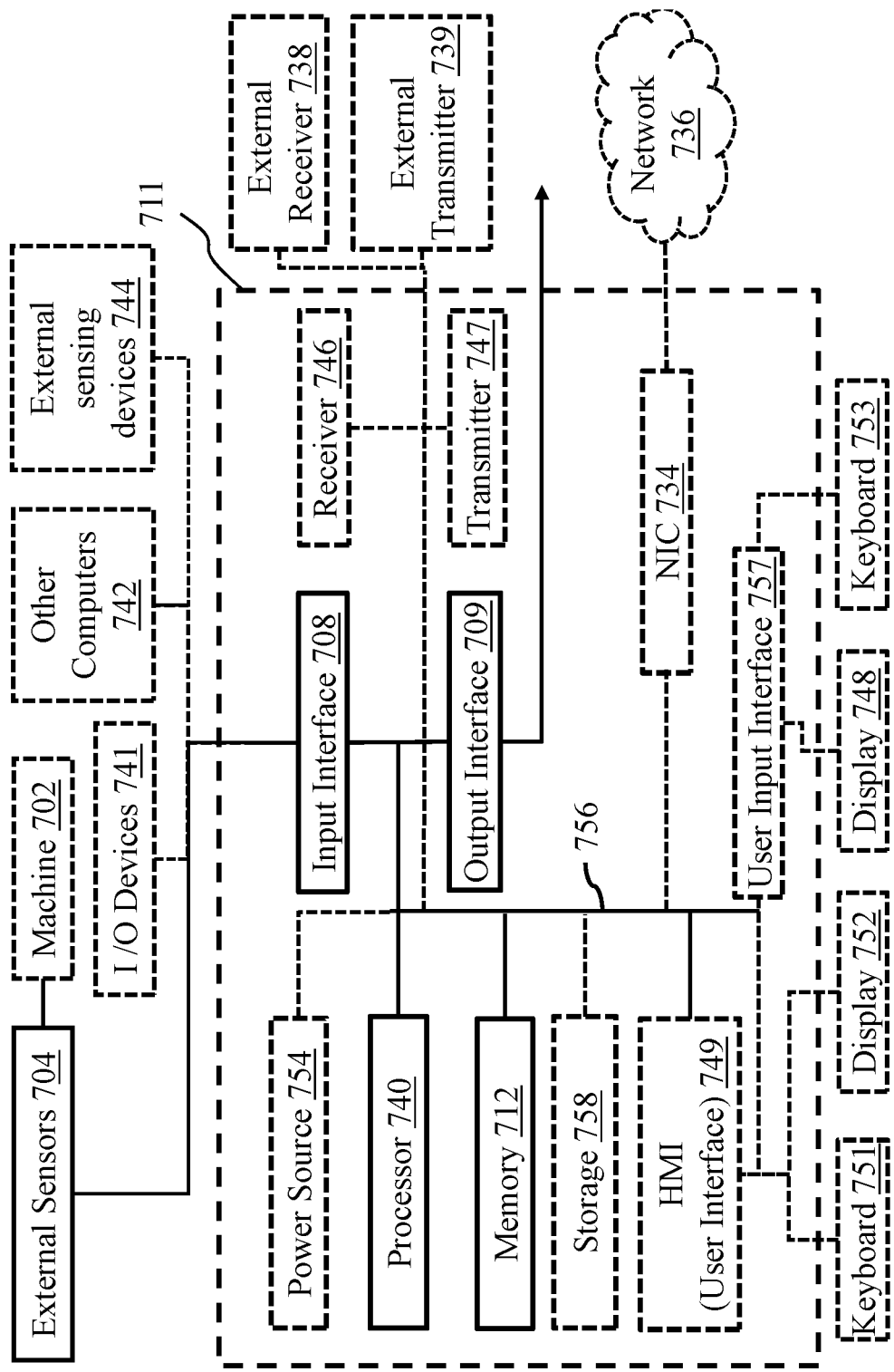
FIG. 7 illustrates a block diagram of a system for training the neural network and a system for image registration and fusion, that can be implemented using an alternate computer or processor, according to some example embodiments.

FIG. 7 illustrates a block diagram of a system for training the neural network and a system for image registration and fusion, that can be implemented using an alternate computer or processor, according to some example embodiments. The computer 711 includes a processor 740, computer readable memory 712, storage 758 and user interface 749 with display 752 and keyboard 751, which are connected through bus 756. For example, the user interface 764 in communication with the processor 740 and the computer readable memory 712, acquires and stores the image data in the computer readable memory 712 upon receiving an input from a surface, keyboard 753, of the user interface 757 by a user.

The computer 711 can include a power source 754, depending upon the application the power source 754 may be optionally located outside of the computer 711. Linked through bus 756 can be a user input interface 757 adapted to connect to a display device 748, wherein the display device 748 can include a computer monitor, camera, television, projector, or mobile device, among others. A printer interface 759 can also be connected through bus 756 and adapted to connect to a printing device 732, wherein the printing device 732 can include a liquid inkjet printer, solid ink printer, large-scale commercial printer, thermal printer, UV printer, or dye-sublimation printer, among others. A network interface controller (NIC) 734 is adapted to connect through the bus 756 to a network 736, wherein image data or other data, among other things, can be rendered on a third party display device, third party imaging device, and/or third party printing device outside of the computer 711.

Still referring to FIG. 7, the image data or other data, among other things, may be transmitted over a communication channel of the network 736, and/or stored within the storage system 758 for storage and/or further processing. Further, the time series data or other data may be received wirelessly or hard wired from a receiver 746 (or external receiver 738) or transmitted via a transmitter 747 (or external transmitter 739) wirelessly or hard wired, the receiver 746 and transmitter 747 are both connected through the bus 756. The computer 711 may be connected via an input interface 708 to external sensing devices 744 and external input/output devices 741. For example, the external sensing devices 744 may include sensors gathering data before-during-after of the collected time-series data of the machine. The computer 711 may be connected to other external computers 742. An output interface 709 may be used to output the processed data from the processor 740. It is noted that a user interface 749 in communication with the processor 740 and the non-transitory computer readable storage medium 712, acquires and stores the region data in the non-transitory computer readable storage medium 712 upon receiving an input from a surface 752 of the user interface 749 by a user.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

In this way, example embodiments of the present disclosure find application in many useful end use cases since image alignment is a key component for such image processing based applications. Achieving the image alignment for images of different modality in the manner illustrated and described herein result in faster computations and lower computational complexity thereby enhancing the overall turn around time for the intended task. Therefore, the training of the neural network for predicting domain invariant features is tied to several practical applications and also leads to several technical improvements. Image processing methods and systems that incorporate the proposed training and execution of the neural network benefit with the new capabilities and performance incentives steered by the novel training and registration approaches, thereby leading to improvements in the underlying image processing technology.

Also, the embodiments of the present disclosure may be embodied as a method, of which some examples have been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as first, second, in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A computer implemented method for training a neural network for extracting domain-invariant features suitable for image registration, wherein the method uses a processor coupled with a memory storing instructions, the method, comprising:
    collecting a first set of multi-modal images including at least a first image of a first modality and at least one corresponding second image of a second modality;
    extracting first features from the at least one first image using a first feature extraction subnet of the neural network;
    extracting second features from the at least one second image using a second feature extraction subnet of the neural network;
    comparing the first features with the second features to estimate a domain-invariant embedding loss of extracted features of the first set of multi-modal images;
    submitting the first features and the second features to a HomographyNet of the neural network to estimate a homography loss of the extracted features of the first set of multi-modal images; and
    training the neural network by training the first feature extraction subnet, and the second feature extraction subnet of the neural network and the HomographyNet to jointly minimize a multi-objective loss function including the domain-invariant embedding loss and the homography loss.

2. The method of claim 1, further comprising:
    extracting third features from the at least one first image using a third feature extraction subnet of the neural network;
    extracting fourth features from the at least one second image using a fourth feature extraction subnet of the neural network; and
    comparing the third features with the fourth features to estimate a domain specific embedding loss for the first set of multi-modal images.

3. The method of claim 2, wherein the multi-objective loss function further includes the estimated domain specific embedding loss.

4. The method of claim 1, wherein the first modality and the second modality are selected from a group consisting of optical color images, optical gray-scale images, depth images, infrared images, and synthetic aperture radar (SAR) images.

5. A multi-modal image registration method for registering a second set of multi-modal images using the trained neural network of claim 1, comprising:
    collecting the second set of multi-modal images of a scene including a first test image of the first modality and a second test image of the second modality;
    extracting first test features from the first test image using the first feature extraction subnet of the trained neural network;
    extracting second test features from the second test image using the second feature extraction subnet of the trained neural network; and
    registering the first test image and the second test image by comparing the first test features with the second test features.

6. The multi-modal image registration method of claim 5, further comprising:
    extracting third test features from the first test image using a third feature extraction subnet of the trained neural network;
    extracting fourth test features from the second test image using a fourth feature extraction subnet of the trained neural network;
    matching one or more keypoints in the third test features with one or more keypoints in the fourth test features; and
    registering the pair of test images based on the matching.

7. The multi-modal image registration method of claim 6, further comprising:
    computing a first ground cost distance of the third test features extracted from the first test image;
    computing a second ground cost distance of the fourth test features extracted from the second test image;
    determining a first ground cost term, based on the first ground cost distance and the second ground cost distance;
    computing a third ground cost distance of the first test features extracted from the first test image;
    computing a fourth ground cost distance of the second test features extracted from the second test image;
    determining a second ground cost term, based on the first ground cost distance and the second ground cost distance;
    solving an optimal transport (OT) problem to produce a registration map by optimizing a cost function that determines a minimum of a combination of the first ground cost term and the second ground cost term.

8. The method of claim 1, wherein estimating the domain-invariant embedding loss of extracted features of the first set of multi-modal images comprises:
    obtaining first feature vectors for every pixel of the at least one first image based on the extracted first features;
    obtaining second feature vectors for every pixel of the at least one second image based on the extracted second features;
    sampling corresponding and non-corresponding pixels between the at least one first image and the at least one second image, based on ground truth data; and
    computing the domain-invariant embedding loss of extracted features of the first set of multi-modal images based on the sampled corresponding and non-corresponding pixels.

9. The method of claim 1, wherein estimating the homography loss of the extracted features of the first set of multi-modal images comprises:
    estimating homography between the at least one first image and the at least one second image, based on the extracted first features and the second features;
    obtaining ground truth homography data for the at least one first image and the at least one second image; and
    compute the homography loss of the extracted features, based on the estimated homography and the ground truth homography data.

10. The method of claim 9, wherein the estimated homography is a 3×3 real valued matrix.

11. A system for training a neural network for extracting domain-invariant features suitable for image registration, the system comprising:
a memory configured to store executable instructions; and
a processor configured to execute the instructions to:
collect a first set of multi-modal images including at least a first image of a first modality and at least one corresponding second image of a second modality;
extract using a first feature extraction subnet of the neural network, first features from the at least one first image;
extract using a second feature extraction subnet of the neural network, second features from the at least one second image;
compare the first features with the second features to estimate a domain-invariant embedding loss of extracted features of the first set of multi-modal images;
submit the first features and the second features to a HomographyNet of the neural network to estimate a homography loss of the extracted features of the first set of multi-modal images; and
train the neural network by training the first feature extraction subnet, and the second feature extraction subnet of the neural network and the HomographyNet to jointly minimize a multi-objective loss function including the domain-invariant embedding loss and the homography loss.

12. The system of claim 11, wherein the processor is further configured to:
extract using a third feature extraction subnet of the neural network, third features from the at least one first image;
extract using a fourth feature extraction subnet of the neural network fourth features from the at least one second image; and
compare the third features with the fourth features to estimate a domain specific embedding loss for the first set of multi-modal images.

13. The system of claim 12, wherein the multi-objective loss function further includes the estimated domain specific embedding loss.

14. The system of claim 11, wherein the first modality and the second modality are selected from a group consisting of optical color images, optical gray-scale images, depth images, infrared images, and synthetic aperture radar (SAR) images.

15. A multi-modal image registration system for registering the first set of multi-modal images using the trained neural network of claim 11, the multi-modal image registration system comprising circuitry configured to:
collect a second set of multi-modal images of a scene including a first test image of the first modality and a second test image of the second modality;
extract using the first feature extraction subnet of the trained neural network, first test features from the first test image;
extract using the second feature extraction subnet of the trained neural network, second test features from the second test image; and
register the first test image and the second test image by comparing the first test features with the second test features.

16. The multi-modal image registration system of claim 15, wherein the circuitry is further configured to:
extract using a third feature extraction subnet of the trained neural network, third test features from the first test image;
extract using a fourth feature extraction subnet of the trained neural network, fourth test features from the second test image;
determine a plurality of corresponding points in the first test image and the second test image;
estimate homography relating the first test image and the second test image, based on the plurality of corresponding points; and
register the pair of test images based on the estimated homography.

17. The system of claim 11, wherein to estimate the domain-invariant embedding loss of extracted features of the first set of multi-modal images, the processor is further configured to:
obtain first feature vectors for every pixel of the at least one first image based on the extracted first features;
obtain second feature vectors for every pixel of the at least one second image based on the extracted second features;
sample corresponding and non-corresponding pixels between the at least one first image and the at least one second image, based on ground truth data; and
compute the domain-invariant embedding loss of extracted features of the first set of multi-modal images based on the sampled corresponding and non-corresponding pixels.

18. The system of claim 11, wherein to estimate the homography loss of the extracted features of the first set of multi-modal images, the processor is further configured to:
estimate homography between the at least one first image and the at least one second image, based on the extracted first features and the second features;
obtain ground truth homography data for the at least one first image and the at least one second image; and
compute the homography loss of the extracted features, based on the estimated homography and the ground truth homography data.

19. The system of claim 18, wherein the estimated homography is a 3×3 real valued matrix.

20. A non-transitory computer readable medium having stored thereon computer-executable instructions which when executed by a computer, causes the computer to perform a method for training a neural network for extracting domain-invariant features suitable for image registration, the method comprising:
collecting a first set of multi-modal images including at least a first image of a first modality and at least one corresponding second image of a second modality;
extracting first features from the at least one first image using a first feature extraction subnet of the neural network;
extracting second features from the at least one second image using a second feature extraction subnet of the neural network;
comparing the first features with the second features to estimate a domain-invariant embedding loss of extracted features of the first set of multi-modal images;
submitting the first features and the second features to a HomographyNet of the neural network to estimate a homography loss of the extracted features of the first set of multi-modal images; and
training the neural network by training the first feature extraction subnet, and the second feature extraction subnet of the neural network and the HomographyNet to jointly minimize a multi-objective loss function including the domain-invariant embedding loss and the homography loss.

\* \* \* \* \*